US008902911B2

(12) United States Patent
Berman

(10) Patent No.: US 8,902,911 B2
(45) Date of Patent: *Dec. 2, 2014

(54) SYSTEM AND METHOD FOR INTERCONNECTING ETHERNET AND FIBRE CHANNEL

(75) Inventor: Stuart B. Berman, Newport Beach, CA (US)

(73) Assignee: Emulex Corporation, Costa Mesa, CA (US)

( * ) Notice: Subject to any disclaimer, the term of this patent is extended or adjusted under 35 U.S.C. 154(b) by 145 days.

This patent is subject to a terminal disclaimer.

(21) Appl. No.: 13/401,177

(22) Filed: Feb. 21, 2012

(65) Prior Publication Data

US 2013/0016733 A1    Jan. 17, 2013

Related U.S. Application Data

(63) Continuation of application No. 12/421,961, filed on Apr. 10, 2009, now Pat. No. 8,121,137, which is a continuation of application No. 11/375,268, filed on Mar. 13, 2006, now Pat. No. 7,522,619, which is a continuation of application No. 10/198,867, filed on Jul. 18, 2002, now Pat. No. 7,012,914, which is a continuation of application No. 09/611,173, filed on Jul. 6, 2000, now Pat. No. 6,470,007, which is a continuation of application No. 08/907,385, filed on Aug. 7, 1997, now Pat. No. 6,118,776, which is a continuation-in-part of application No. 08/801,471, filed on Feb. 18, 1997, now Pat. No. 6,185,203.

(51) Int. Cl.
H04L 12/28    (2006.01)
H04L 12/46    (2006.01)
H04L 12/933   (2013.01)

(52) U.S. Cl.
CPC ........... *H04L 12/4637* (2013.01); *H04L 49/101* (2013.01); *H01L 49/253* (2013.01); *H01L 49/254* (2013.01); *H01L 49/3009* (2013.01); *H01L 49/351* (2013.01); *H01L 49/352* (2013.01); *H01L 49/357* (2013.01); *H01L 49/604* (2013.01)
USPC ........................... 370/404; 370/405; 370/406

(58) Field of Classification Search
None
See application file for complete search history.

(56) References Cited

U.S. PATENT DOCUMENTS 4,716,575 A    12/1987  Douros et al.
4,809,269 A    2/1989   Gulick (Continued)

OTHER PUBLICATIONS

Chin, "Fibre Channel Offers Another Road to High-Speed Networking and I/O", Computer Technology Review, vol. 15, No. Suppl., Dec. 21, 1995, 45-47.

(Continued)

Primary Examiner — Jay P Patel
(74) Attorney, Agent, or Firm — McAndrews, Held & Malloy, Ltd.

(57) ABSTRACT

A system and method for interconnecting Ethernet and fiber channel is provided. The system includes a port containing an optical receiver, a port control module, a route determination module, and a connectivity module. The port control module is operably connected to the port and may perform 8B/10B encoding and decoding. The route determination module selects a route between the port control module and the Ethernet link. The connectivity module is operably connected to the port control module and to the route determination module. The connectivity apparatus may switch frames between the port control module and the Ethernet link under control of the route determination module in order to transfer Fiber Channel frames to the Ethernet link.

16 Claims, 16 Drawing Sheets

(56) References Cited

U.S. PATENT DOCUMENTS

| | | | |
|---|---|---|---|
| 4,821,034 A | 4/1989 | Anderson et al. | |
| 4,862,451 A | 8/1989 | Closs et al. | |
| 4,908,823 A * | 3/1990 | Haagens et al. | 370/464 |
| 4,958,341 A | 9/1990 | Hemmady et al. | |
| 4,970,721 A | 11/1990 | Aczel et al. | |
| 5,007,051 A | 4/1991 | Dolkas et al. | |
| 5,042,032 A | 8/1991 | Dighe et al. | |
| 5,262,625 A | 11/1993 | Tom et al. | |
| 5,319,644 A | 6/1994 | Liang | |
| 5,341,476 A | 8/1994 | Lowell | |
| 5,412,653 A | 5/1995 | Hoppe et al. | |
| 5,418,780 A | 5/1995 | Henrion | |
| 5,432,907 A | 7/1995 | Picazo, Jr. et al. | |
| 5,490,007 A | 2/1996 | Bennett et al. | |
| 5,502,719 A | 3/1996 | Grant et al. | |
| 5,519,695 A | 5/1996 | Purohit et al. | |
| 5,528,584 A | 6/1996 | Grant et al. | |
| 5,535,035 A | 7/1996 | DeFoster et al. | |
| 5,548,590 A | 8/1996 | Grant et al. | |
| 5,570,360 A | 10/1996 | Klausmeier et al. | |
| 5,592,160 A | 1/1997 | Bennett et al. | |
| 5,592,472 A | 1/1997 | Grant et al. | |
| 5,598,541 A | 1/1997 | Malladi | |
| 5,603,064 A | 2/1997 | Bennett | |
| 5,610,745 A | 3/1997 | Bennett | |
| H1641 H | 4/1997 | Sharman | |
| 5,617,413 A | 4/1997 | Monacos | |
| 5,619,497 A | 4/1997 | Gallagher et al. | |
| 5,619,500 A | 4/1997 | Hiekali | |
| 5,638,518 A | 6/1997 | Malladi | |
| 5,642,337 A * | 6/1997 | Oskay et al. | 709/230 |
| 5,655,140 A | 8/1997 | Haddock | |
| 5,655,153 A | 8/1997 | Sandorfi | |
| 5,659,718 A | 8/1997 | Osman et al. | |
| 5,745,727 A | 4/1998 | Chau et al. | |
| 5,751,715 A | 5/1998 | Chan et al. | |
| 5,768,530 A * | 6/1998 | Sandorfi | 709/233 |
| 5,768,551 A | 6/1998 | Bleiweiss et al. | |
| 5,768,623 A | 6/1998 | Judd et al. | |
| 5,799,209 A * | 8/1998 | Chatter | 710/56 |
| 5,802,290 A | 9/1998 | Casselman | |
| 5,812,754 A | 9/1998 | Lui et al. | |
| 5,828,475 A | 10/1998 | Bennett et al. | |
| 5,838,937 A * | 11/1998 | Lee et al. | 710/316 |
| 5,841,990 A | 11/1998 | Picazo, Jr. et al. | |
| 5,872,822 A | 2/1999 | Bennett | |
| 5,892,913 A | 4/1999 | Adiga et al. | |
| 5,894,481 A | 4/1999 | Book | |
| 5,898,828 A | 4/1999 | Pignolet et al. | |
| 5,937,174 A * | 8/1999 | Weber | 710/312 |
| 5,941,972 A | 8/1999 | Hoese et al. | |
| 5,956,723 A | 9/1999 | Zhu | |
| 5,978,379 A | 11/1999 | Chan et al. | |
| 5,991,891 A * | 11/1999 | Hahn et al. | 714/4.21 |
| 6,005,849 A | 12/1999 | Roach et al. | |
| 6,014,383 A | 1/2000 | McCarty | |
| 6,014,715 A | 1/2000 | Stoevhase | |
| 6,031,842 A | 2/2000 | Trevitt et al. | |
| 6,038,047 A | 3/2000 | Nava et al. | |
| 6,038,217 A | 3/2000 | Lyles | |
| 6,041,381 A | 3/2000 | Hoese | |
| 6,055,228 A | 4/2000 | DeKoning et al. | |
| 6,057,863 A | 5/2000 | Olarig | |
| 6,073,218 A * | 6/2000 | DeKoning et al. | 711/150 |
| 6,118,776 A | 9/2000 | Berman | |
| 6,138,199 A | 10/2000 | Fleischer | |
| 6,151,316 A | 11/2000 | Crayford et al. | |
| 6,157,613 A | 12/2000 | Watanabe et al. | |
| 6,160,813 A | 12/2000 | Banks et al. | |
| 6,167,463 A | 12/2000 | Arp et al. | |
| 6,185,203 B1 | 2/2001 | Berman | |
| 6,192,048 B1 | 2/2001 | Nelson et al. | |
| 6,192,054 B1 | 2/2001 | Chan et al. | |
| 6,205,145 B1 | 3/2001 | Yamazaki | |
| 6,226,296 B1 * | 5/2001 | Lindsey et al. | 370/401 |
| 6,304,910 B1 | 10/2001 | Roach et al. | |
| 6,314,100 B1 | 11/2001 | Roach et al. | |
| 6,314,488 B1 | 11/2001 | Smith | |
| 6,324,181 B1 | 11/2001 | Wong et al. | |
| 6,356,944 B1 | 3/2002 | McCarty | |
| 6,400,730 B1 | 6/2002 | Latif et al. | |
| 6,414,953 B1 | 7/2002 | Lamarche et al. | |
| 6,426,947 B1 | 7/2002 | Banker et al. | |
| 6,470,007 B1 | 10/2002 | Berman | |
| 6,470,026 B1 | 10/2002 | Pearson et al. | |
| 6,614,796 B1 | 9/2003 | Black et al. | |
| 6,636,507 B1 | 10/2003 | Miyoshi et al. | |
| 6,784,572 B1 * | 8/2004 | Backman et al. | 310/12.01 |
| 6,904,053 B1 | 6/2005 | Berman | |
| 6,961,775 B2 | 11/2005 | Rao | |
| 6,975,590 B2 | 12/2005 | Killen, Jr. et al. | |
| 7,012,914 B2 | 3/2006 | Berman | |
| 7,145,877 B2 | 12/2006 | Natarajan et al. | |
| 7,336,007 B2 * | 2/2008 | Chitayat et al. | 310/12.07 |
| 7,362,769 B2 | 4/2008 | Black et al. | |
| 7,382,790 B2 | 6/2008 | Warren et al. | |
| 7,484,021 B2 | 1/2009 | Rastogi et al. | |
| 7,522,619 B2 | 4/2009 | Berman | |
| 7,542,676 B2 | 6/2009 | McGlaughlin | |
| 7,664,018 B2 | 2/2010 | Warren et al. | |
| 7,688,735 B1 | 3/2010 | Berman | |
| 7,770,208 B2 | 8/2010 | Barnett et al. | |
| 7,801,117 B2 | 9/2010 | Berman | |
| 7,801,118 B2 | 9/2010 | Berman | |
| 2003/0086377 A1 | 5/2003 | Berman | |
| 2003/0095549 A1 | 5/2003 | Berman | |
| 2005/0226259 A1 | 10/2005 | Berman | |
| 2005/0226260 A1 | 10/2005 | Berman | |
| 2008/0240137 A1 | 10/2008 | Berman | |
| 2009/0063846 A1 * | 3/2009 | Baker et al. | 713/150 |
| 2009/0225772 A1 | 9/2009 | Berman | |
| 2010/0183022 A1 | 7/2010 | Berman | |

OTHER PUBLICATIONS

Fibre Channel Switch Fabric (FC-SW) Rev. 3.3, American National Standard for Information Systems, Oct. 21, 1997, iii-x, 1-98.

Fibre Channel Link Encapsulation (FC-LE) REV. 1.1, American National Standard for Information Systems, Jun. 26, 1996, i-xi, 1-41.

Fibre Channel Physical and Signalling Interface—3 (FC-PH-3) REV 9.4, American National Standard for Information Systems, Nov. 5, 1997, i-xxi, 1-113.

Fibre Channel Private Loop SCSI Direct Attach (FC-PLDA) REV 2.1, American National Standard for Information Systems, Sep. 22, 1997, i-viii, 1-80,I-1-I-4.

Fibre Channel Arbitrated Loop (FC-AL-2) REV 6.1, American National Standard for Information Systems, Feb. 16, 1998, i-xiv, 1-104.

Fibre Channel Arbitrated Loop (FC-AL) REV 4.5, American National Standard for Information Systems, Jun. 1, 1995, ii-x, 1-92.

Fibre Channel Generic Services (FC-GS) REV 3.1, American National Standard for Information Systems, Aug. 7, 1996, i-xiv, 1-84, I-1-I-2.

Fibre Channel Single-Byte Command Code Sets (SBCCS) Mapping Protocol (FC-SB) REV 3.4, American National Standard for Information Systems, May 26, 1995, i-xiv, 1-102, I-1-I-5.

Fibre Channel Physical and Signalling Interface—2 (FC-PH-2) Rev 7.4, American National Standard for Information Systems, Sep. 10, 1996, i-xxii, 1-161, I-1-I-3.

Fibre Channel Physical and Signalling Interface (FC-PH) REV 4.3, American National Standard for Information Systems, Jun. 1, 1994, i-xxxiv, 1-388,I-1-I-9, and Table Definitions.

Fibre Channel Fabric Loop Attachment (FC-FLA), Rev. 2.7, NCITS working draft proposed Technical Report, Aug. 12, 1997, i-xiv, 1-122.

Malavalli, "Distributed Computing With Fibre Channel Fabric", Digest of Papers, IEEE COMPCON, Feb. 1992, 269-274.

Malavalli, "High Speed Fibre Channel Switching Fabric Services", Proceedings of SPIE, vol. 1577, Sep. 4, 1991, 216-226.

Martin, "Fabric Interconnection of Fibre Channel Standard Nodes", Proceedings of the SPIE, vol. 1784, Sep. 8, 1993, 65-71.

(56) References Cited

OTHER PUBLICATIONS

Meggyesi, "Fibre Channel Overview", Research Institute for Particle and Nuclear Physics, Aug. 15, 1994, 1-10.
PCT International Search Report, Jul. 20, 1998.
Platt, "Traffic Management in Frame Relay Networks", Computer Networks and ISDN Systems, vol. 23, No. 4, Jan. 1992, 305-316.
Ravidran, et al., "A Comparison of Blocking and Non-Blocking Packet Switching Techniques in Hierarchical Ring Networks", IEICE Transactions on Information and Systems 1, vol. E79-D, No. 8, Aug. 1996, 1130-1138.
Rickard, "Fibre Channel as a Network Backbone", WESCON, Sep. 27, 1994, 653-659.
Stephens, et al., "Fibre Channel : The Basics, Frame Routing", ANCOT Corporation, 1995, 9-1-10-17.
Stephens, et al., "Fibre Channel : The Basics", ANCOT Corporation, Jun. 1995, 5-6-5-9.
Varma, et al., "Using Camp-On to Improve the Performance of a Fibre Channel Switch", Proceedings of the Conference on Local Computer Networks, 1993, 247-255.

* cited by examiner

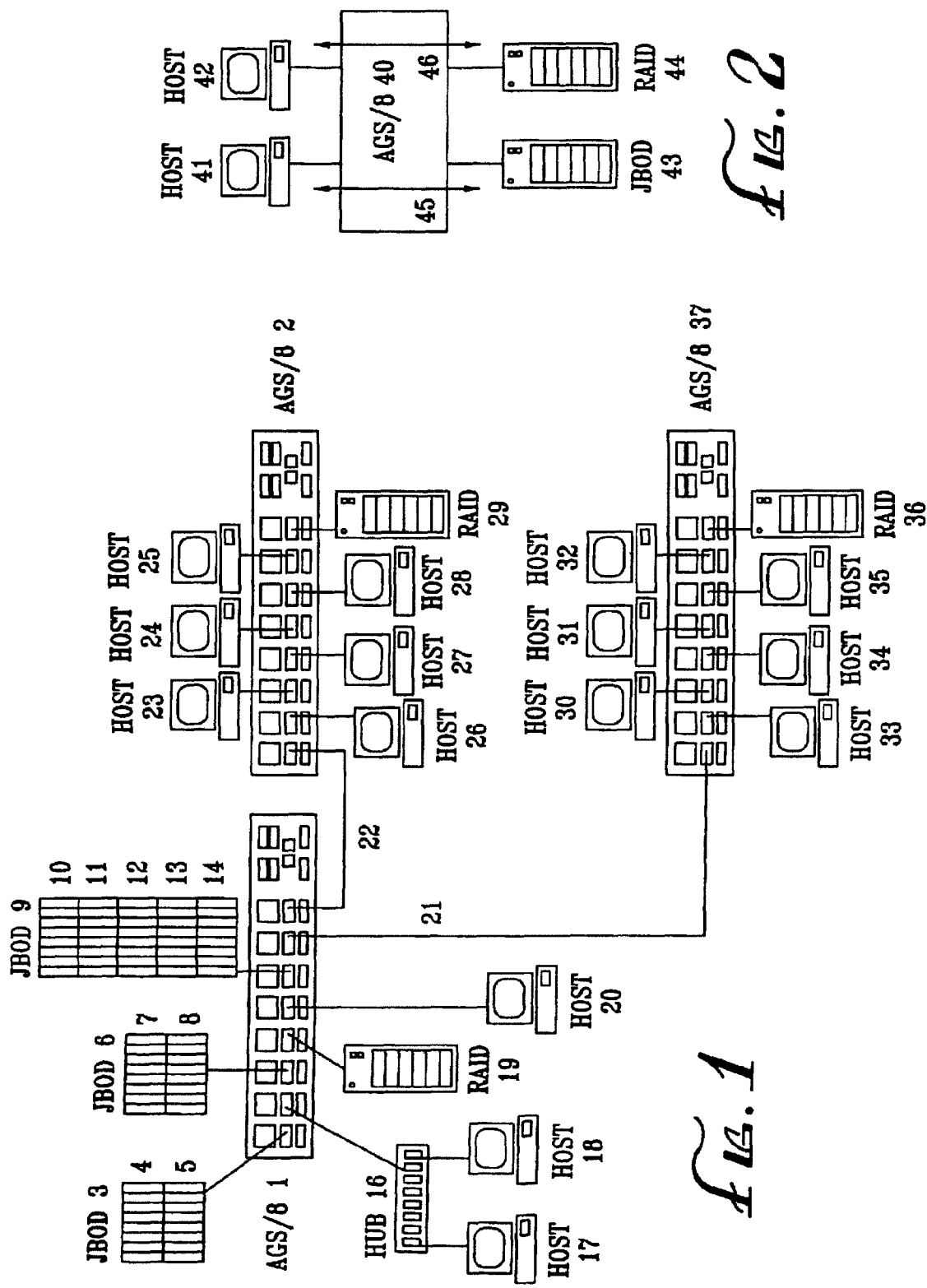

FABRIC CONTROL

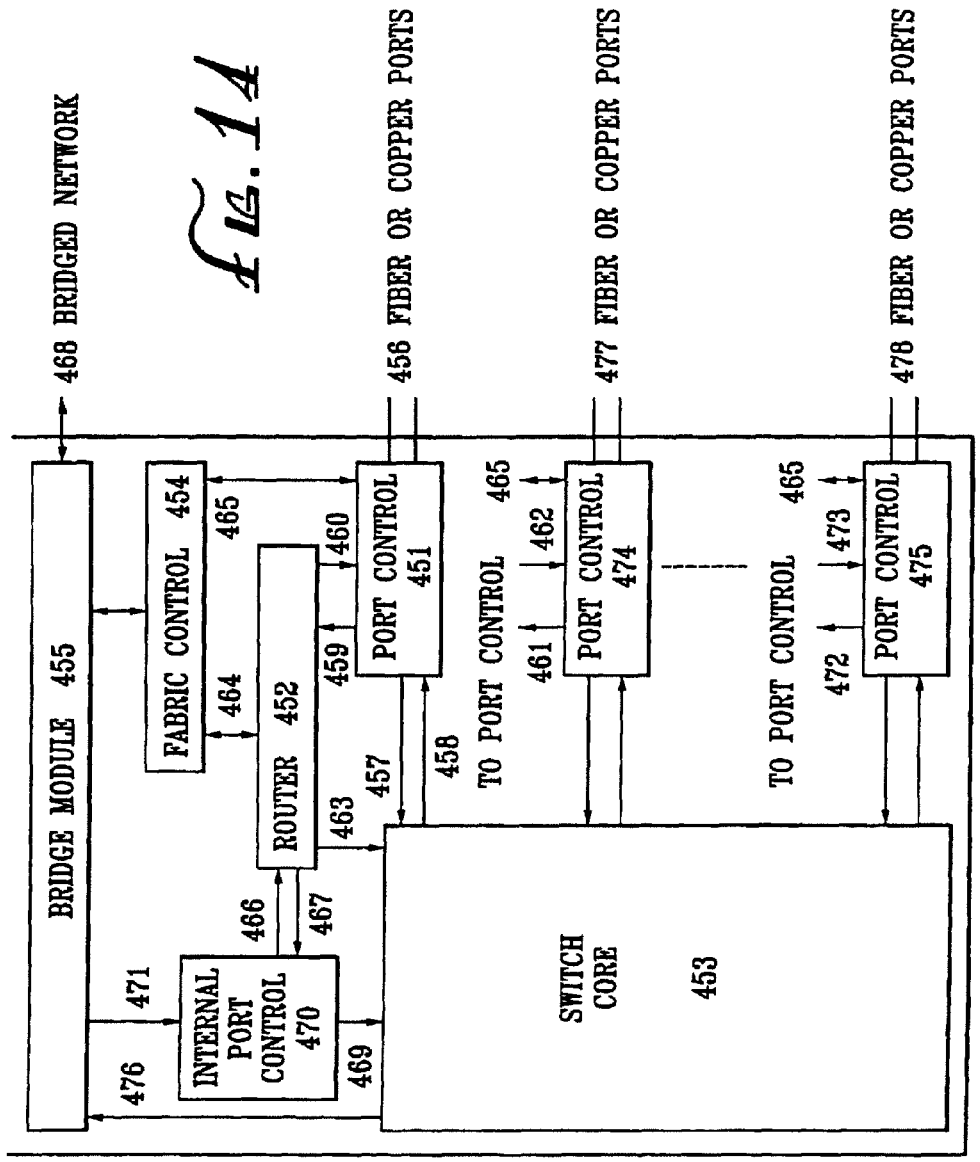

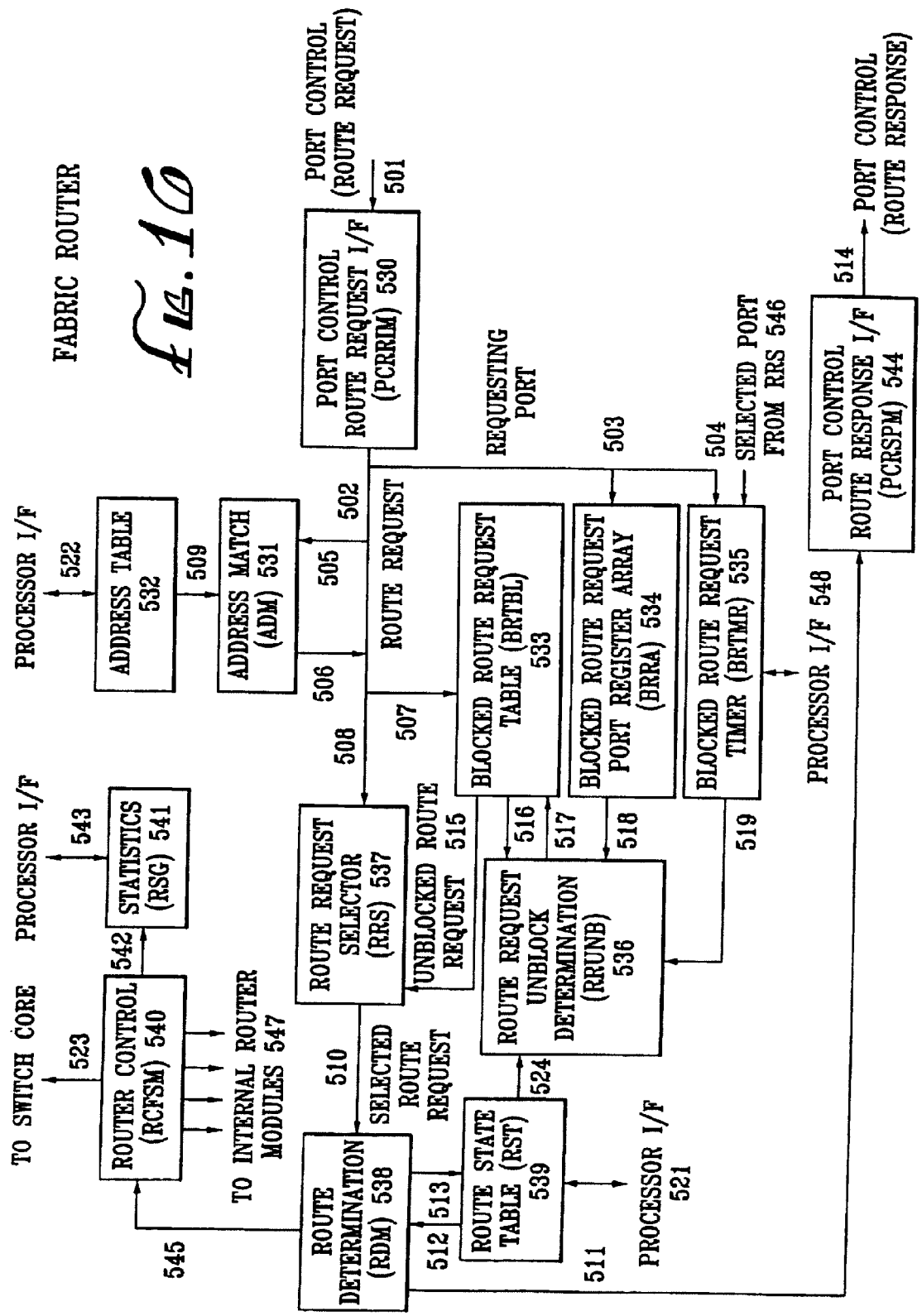

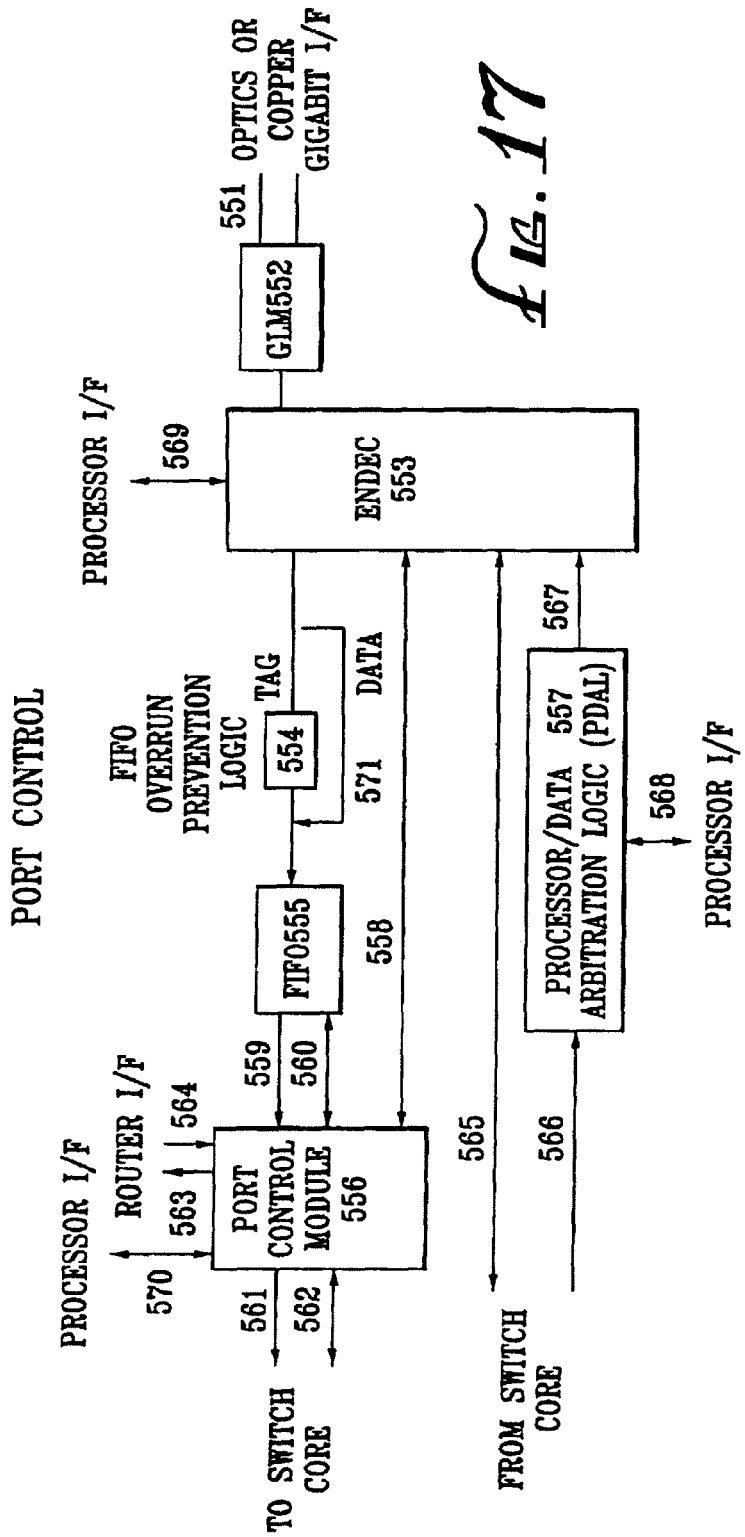
Fig. 17
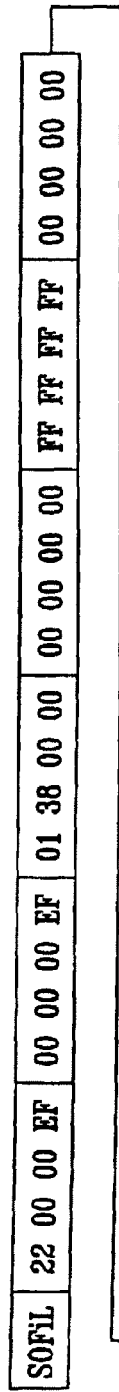
Fig. 18

LIFA FRAME FORMAT

EXAMPLE ALLOWING ONLY THE ALPA'S 10, 17, 18, 1B, 1D, 1E AND 1F TO BE CHOSEN

| SOFiL | 22 00 00 EF | 00 00 00 00 | 01 38 00 00 | 00 00 00 00 | FF FF FF FF | 00 00 00 00 |

16 BYTE (3 WORD) ALPA MAP 602

| 11 02 00 00 | 7E 03 FF FF | FF FF FF FF | FF FF FF FF | CRC | EOFt |

LISM FRAME FORMAT

EXAMPLE WORLD WIDE PORT NAME OF ALL ZEROS TO OBTAIN LOOP INITIALIZATION MASTERSHIP

| SOFiL | 22 00 00 EF | 00 00 00 00 | 01 38 00 00 | 00 00 00 00 | FF FF FF FF | 00 00 00 00 |

8 BYTE WORLD WIDE PORT NAME

| 11 01 00 00 | 00 00 00 00 | 00 00 00 00 | CRC | EOFt |

SYSTEM AND METHOD FOR INTERCONNECTING ETHERNET AND FIBRE CHANNEL

RELATED APPLICATIONS

This application is a continuation of application U.S. application Ser. No. 12/421,961, filed Apr. 10, 2009, now U.S. Pat. No. 8,121,137, which is a continuation application of U.S. application Ser. No. 11/375,268, filed Mar. 13, 2006, now issued as U.S. Pat. No. 7,522,619, which is a continuation of application U.S. application Ser. No. 10/198,867, filed Jul. 18, 2002, now issued as U.S. Pat. No. 7,012,914, which is a continuation of application U.S. application Ser. No. 09/611,173, filed Jul. 6, 2000, now issued as U.S. Pat. No. 6,470,007, which is a continuation of application U.S. application Ser. No. 08/907,385, filed Aug. 7, 1997, now issued as U.S. Pat. No. 6,118,776, which is a continuation-in-part of application Ser. No. 08/801,471, filed Feb. 18, 1997, now issued as U.S. Pat. No. 6,185,203. The above-referenced United States patent applications are all hereby incorporated by reference herein in their entirety.

FIELD OF THE INVENTION

The present invention relates to input/output channel and networking systems, and more particularly to methods of using a Fibre Channel fabric or intelligent bridging hub to interconnect Fibre Channel Arbitrated Loops composed of private loop devices (i.e., devices which do not support direct fabric attachment).

BACKGROUND OF THE INVENTION

Fibre Channel is an American National Standards Institute (ANSI) set of standards which describes a high performance serial transmission protocol which supports higher level storage and network protocols such as HIPPI, SCSI, IP, ATM and others. Fibre Channel was created to merge the advantages of channel technology with network technology to create a new I/O interface which meets the requirements of both channel and network users. Channel technology is usually implemented by I/O systems in a closed, structured and predictable environment, whereas network technology usually refers to an open, unstructured and unpredictable environment.

Advantages of Fibre Channel typically include the following. First, it achieves high performance, which is a critical in opening the bandwidth limitations of current computer to storage and computer to computer interfaces at speeds up to 1 gigabit per second or faster. Second, utilizing fiber optic technology, Fibre Channel can overcome traditional I/O channel distance limitations and interconnect devices over distances of 6 miles at gigabit speeds. Third, it is high level protocol independent, enabling Fibre Channel to transport a wide variety of protocols over the same media. Fourth, Fibre Channel uses fiber optic technology which has a very low noise properties. Finally, cabling is simple in that Fibre Channel typically replaces bulky copper cables with small lightweight fiber optic cables.

Fibre Channel supports three different topologies: point-to-point, Arbitrated Loop and fabric attached. The point-to-point topology attaches two devices directly. The Arbitrated Loop topology attaches devices in a loop. The fabric attached topology attaches a device directly to a fabric.

The Arbitrated Loop topology was initially designed to provide a lower cost interconnect than fabrics and to provide more interconnect than point-to-point topologies. The Arbitrated Loop topology was created by separating the transmit and receive fibers associated with each loop port and connecting the transmit output of one loop port to the receive input of the next loop port. Typically, characteristics of the Arbitrated Loop topology include: first it, allows up to 126 participating node ports and one participating fabric port to communicate, second, each node port implements a route filtering algorithm, and third, all ports on a single loop have the same upper 16 bits of the 24-bit NL_Port address identifier.

There are two classifications of devices on an Arbitrated Loop: private loop devices and public loop devices. Public loop devices attempt a Fabric Login (FLOGI) upon initialization. Public loop devices also are cognizant of all twenty four bits of the 24-bit NL_Port native port address identifier. Public loop devices will open the fabric port at Arbitrated Loop Physical Address (ALPA, bits 7 to 0) zero when the domain and area (bits 23 to 8) do not match their domain and area. Private loop devices use only the lower eight bits of the ALPA and can only communicate within the local loop.

Generally, the disadvantages of the Arbitrated Loop topology include: first, it is a blocking topology, that is, only a single connection between a pair of nodes is allowed at any point in time (excluding the broadcast mode). Second, device buffering occurs in each device as it has a six word buffer, creating a delay of up to 225 nanoseconds. This delay is additive with each device in the loop. The delay creates overhead for the communicating devices when a large number of devices are connected to a loop. Third, distance also adds delay to a loop and is additive for each device. For copper medium there is a 4 nanosecond delay per meter and for optical medium there is a 5 nanosecond delay per meter. Fourth, robustness is an issue since all devices are on one loop any device failure will cause the entire loop to fail or reset. Fifth, the total bandwidth available is limited to the bandwidth of the loop itself. Finally, device failure is an issue since while frames are being transmitted, a timeout in an upper level protocol may occur, thereby disrupting the applications.

Loop devices are typically interconnected on an Arbitrated Loop with a hub, see FIG. 22 numeral 678. The hub is a passive device, that is a loop exists within the hub 674, 675, 676, 677, 679. A hub in most cases maintains the loop's integrity when devices are removed, powered off, or fail by using a port bypass circuit 674, 675, 676, 677. Hubs simply receive and redrive the signals to individual devices.

There are many disadvantages which result when interconnecting private loop devices with hubs: First, hubs do not address the blocking nature of the loop topology. Second, jitter is propagated from bypassed nodes. This additive affect causes loop instability when a large number of devices are interconnected. Third, when data is currently being transferred and a device attached to a hub is powered off or fails, the loop could be reset which is destructive to the communicating devices. Fourth, if a device is inserted into a live loop the loop will be reset which is destructive to the communicating devices.

The majority of initial Fibre Channel equipment deployment utilizes the Arbitrated Loop topology with hubs as the interconnect. These environments are experiencing all the previously defined problems inherent in both Arbitrated Loop topology and with hub deployment. The blocking nature of the Arbitrated Loop is limiting the number of devices on a loop. The distance and delay parameters are also creating more overhead for the loop. Finally the loop is being reset by single devices.

As such, it is the goal of this invention to provide apparatus and methods which solve or mitigate these problems.

SUMMARY OF THE INVENTION

This invention relates to methods and apparatus for Fibre Channel interconnection of a plurality of private loop devices through a Fibre Channel private loop device interconnect system. In the preferred embodiments, the Fibre Channel private loop device interconnect system is a fabric or an intelligent bridging hub. Through these methods and apparatus, multiple Fibre Channel Arbitrated Loops, the loops containing one or more private loop devices, may be interconnected even though on separate Arbitrated Loops.

In the preferred embodiment, an interconnection system is provided for connecting a plurality of physically separate Fibre Channel Arbitrated Loops, the loops either containing, or being adapted to contain, one or more private loop devices. The apparatus preferably includes at least a first Arbitrated Loop containing, or adapted to contain, one or more private loop devices, and at least a second Arbitrated Loop, either containing, or adapted to contain, one or more private loop devices. The Arbitrated Loops are interconnected via a Fibre Channel private loop device interconnect system which is disposed between the Arbitrated Loops.

In one embodiment, a Fibre Channel fabric is disposed between the Arbitrated Loops, and includes a routing filter which filters incoming Arbitrated Loop physical addresses (ALPAs) to determine which Fibre Channel frames must attempt to be routed through the fabric. Thus, by disposing routing information regarding private loop devices within the Fibre Channel private loop device interconnect system, multiple Arbitrated Loops containing private loop devices may be interconnected.

Any type of private loop device, consistent with the apparatus and methods stated herein, may be utilized in conjunction with this system. Examples of private loop devices include storage devices, such as tape drives, JBODs and RAID subsystems, host systems, and other connections within a system, such as bridges, particularly SCSI to Fibre Channel bridges, routers, particularly Fibre Channel to asynchronous transfer mode systems and Fibre Channel to ethernet systems. Various interconnection topologies may be utilized with these systems. Beyond a single fabric having two Arbitrated Loops, any number of Arbitrated Loops may be utilized, consistent with the size constraints of the fabric. Alternately, a first fabric, with at least one Arbitrated Loop attached, and a second fabric, with at least one Arbitrated Loop, may have the first fabric and second fabric directly connected. Alternatively, or additionally, a first fabric and a third fabric, each having at least one Arbitrated Loop, may be connected through a second fabric. Yet another topology includes a first fabric having M ports, where one port is connected to storage, preferably JBODs, and the remaining M−1 ports of the first fabric are connected to M−1 second fabrics. An alternative interconnect topology includes a first fabric with M ports, and M second fabrics, each second fabric being connected to the first fabric. In yet another interconnect topology, a device is connected to a first fabric by a first path and to a second fabric by a second, independent path. In yet another interconnect topology, a first set of fabrics and a second set of fabrics may be interconnected through a first intermediate fabric and a second intermediate fabric, each of the first sets of fabrics connected to the first intermediate fabric, and separately to the second intermediate fabric, and each of the second set of fabrics connected to the first intermediate fabric and separately to the second intermediate fabric.

In yet another aspect of this invention, a method is provided for implementing a logical loop of private loop devices in a novel manner. The method generally comprises the steps of segmenting the logical loop of private loop devices into a plurality of sets, assigning each set to a physical Arbitrated Loop and connecting the Arbitrated Loops to a Fibre Channel private loop device interconnect system to effect interconnection of the Arbitrated Loops.

In another aspect of this invention, a method is provided for selectively filtering Fibre Channel frames. This method serves to route frames between one or more private loop devices on a first Arbitrated Loop and one or more private loop devices on at least a second Arbitrated Loop. Preferably, the method includes the steps of receiving the Fibre Channel frames over the first Arbitrated Loop at a connected port of a Fibre Channel private loop device interconnect system and filtering the frame by, either, forwarding the frame on the first Arbitrated Loop if the frame has an address on the first Arbitrated Loop, or, providing an "open" response on the first Arbitrated Loop if the address is not on the first Arbitrated Loop. Optionally, in the event that the frame includes an address not on the first Arbitrated Loop, the additional step of attempting to route the frame through the Fibre Channel private loop device interconnect system may be made. In yet another optional step, buffering of the frames destined to private loop devices not on the first Arbitrated Loop may be performed, most preferably, permitting cut-through if the route can be made without substantial buffering.

Yet another novel method of these inventions is a method for restricting attached devices to Arbitrated Loop physical addresses (ALPAs) within certain ranges. Through this method, multiple Fibre Channel Arbitrated Loops of private loop devices are configured, each private loop device on the Arbitrated Loop having an Arbitrated Loop physical address. Generally, the steps in the preferred method comprise, first, dividing the ALPAs into nonoverlapping sets, second, assigning each set to a separate physical Arbitrated Loop, and thereafter, during loop initialization, forcing the attached private loop devices to choose from the assigned set.

Yet another novel method comprises a method for resetting hosts within a Fibre Channel interconnection system of private loop devices. In this method of operation of an interconnection system, the system including more than one Arbitrated Loop, at least one loop being adapted to contain storage and one loop adapted to contain a host, those devices being private loop devices, the loops being connected to a Fibre Channel private loop device interconnect system, the method generally comprises the steps of, first, detecting at least the addition of a storage device to a first Arbitrated Loop, and thereafter, resetting the Arbitrated Loop or loops on which a host or hosts reside upon such detected addition. In this manner, a host resident on an Arbitrated Loop becomes aware of storage private loop devices which have been added to other Arbitrated Loops separated from the host bearing Arbitrated Loop by a Fibre Channel private loop device interconnect system. In yet another method of operation of the inventive system, a method for operation with use of SCSI initiators is provided. In this interconnection system, the system includes more than one Arbitrated Loop, at least one loop adapted to contain storage and one loop containing a host, the devices attached to the loops being private loop devices, the loops being connected to a Fibre Channel private loop device interconnect system. The method generally comprises the steps of first, receiving port login (PLOGI) input/output (I/O) probes at the Fibre Channel private loop device interconnect system, thereafter, performing address look-up for the received PLOGI I/O probes, and, if a match exists in the look up, routing the PLOGI I/O probes from the Fibre Channel SCSI initiator to private loop devices on the Fibre Channel private loop device interconnect system or other Fibre Channel private loop device interconnect system. In the event that no match is found upon address look up, the PLOGI I/O probes are routed to the Fibre Channel private loop device interconnect system controller, and a link service reject (LS_RJT) is returned. Similarly, a link service reject is returned in the event that an address match is found, but where no device with the destination ALPA exists on the Arbitrated Loop corresponding to the destination.

An intelligent bridging hub adapted to interconnect a plurality of Arbitrated Loops containing private loop devices is provided. The intelligent bridging hub includes at least first and second hub submodules, the submodules comprising a plurality of ports, the ports including port bypass circuits connected to the ports for connecting to the Arbitrated Loops adapted to contain private loop devices, and, an Arbitrated Loop physical address filtering port, a router, the router being disposed between the first and second hub submodules, and a processor control coupled to the router and the first and second submodules. The router need not support all classes of Fibre Channel connections, for example, the router may optionally not support class 1 connections. Optionally, the processor control need not provide back-up route determination mechanisms.

OBJECTS OF THE INVENTION

Accordingly, it is an object of this invention to interconnect separate Arbitrated Loops of private loop devices through Fibre Channel private loop device interconnect system.

It is yet a further object of this invention to segment one logical loop composed of private loop devices into several physical Arbitrated Loops each of which is connected to Fibre Channel private loop device interconnect system.

It is yet a further object of this invention to connect private loop devices over a fabric without any a priori knowledge by those devices or special software driver modifications to support the Fibre Channel private loop device interconnect system.

It is yet a further object of this invention to route the I/O probes from a Fibre Channel SCSI Initiator to private loop devices on other ports on the Fibre Channel private loop device interconnect system or on other ports on connected Fibre Channel private loop device interconnect systems.

It is yet a further object of this invention to handle I/O probes from Fibre Channel SCSI Initiators which are destined for nonexistent devices.

It is yet a further object of this invention to filter the frames received by a Fibre Channel private loop device interconnect system port and select those frames which are destined to private loop devices on separate fabric ports or for other ports on connected Fibre Channel private loop device interconnect system.

It is yet a further object of this invention to reset private loop hosts when storage devices are added or removed on other ports on the Fibre Channel private loop device interconnect system or on other ports on connected Fibre Channel private loop device interconnect system.

It is yet a further object of this invention to limit the ALPA range that connected private loop devices can choose when connected to a Fibre Channel private loop device interconnect system port.

BRIEF DESCRIPTION OF THE DRAWINGS

FIG. 1 is a block diagram illustrating the use of the Stealth Mode in connecting one logical loop of private loop devices by segmenting it into several physical loops all interconnected through a network of fabrics.

FIG. 2 is a block diagram illustrating the bandwidth advantage in connecting multiple pairs of simultaneously communicating private loop devices.

FIG. 14 is a block diagram of a Fibre Channel Fabric.

FIG. 16 is a block diagram of the fabric Router.

FIG. 17 is a block diagram of the fabric Port Control.

FIG. 18 is a diagram of the LIFA frame format.

FIG. 19 is a diagram of an example LIFA frame to restrict ALPA selection to the range 1x, i.e., 10, 17, 18, 1B, 1D, 1E and 1F.

FIG. 20 is a diagram of a LISM frame with a World-wide name of all zeros.

DETAILED DESCRIPTION OF THE INVENTION

Table of Contents

Figure 3:
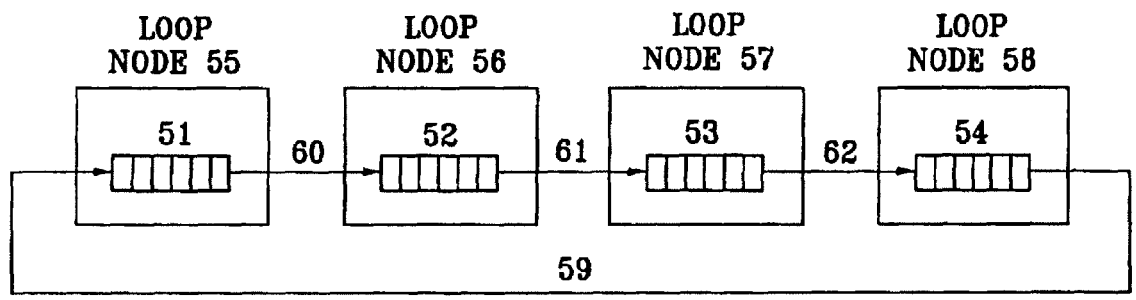
FIG. 3 is a block diagram showing the additive delays of interconnecting several devices in a loop.

A. Definitions
B. Stealth Mode Features and Functions
C. Background—Fibre Channel Fabric Model
  1. Fabric Control Module
  2. Fabric Router
   a. Address Table
   b. Address Match Module
   c. Route Determination Module
  3. Switch Core
  4. Port Control Module
D. Background—Intelligent Bridging Hub
E. ALPA Filtering
F. Port ALPA Range Configuration
G. Fibre Channel SCSI Initiator I/O Probe Spoofing
H. Resetting Host Ports Upon Storage Addition
I. Default Route Configuration
J. Stealth Loop Topologies and Configuration Strategies
K. Other Documents

A. DEFINITIONS

For expository convenience, the present invention in various aspects is referred to as the Stealth Loop Mode, the lexicon being devoid of a succinct descriptive name for a system of the type hereinafter described. The following discussions will be made clearer by a brief review of the relevant terminology as it is typically (but not exclusively) used.

The "Fibre Channel ANSI standard" describes the physical interface, transmission protocol and signaling protocol of a high-performance serial link for support of the higher level protocols associated with HIPPI, IPI, SCSI, IP, ATM and others.

The Fibre Channel Fabric comprises hardware and software that switches Fibre Channel frames between attached devices at speeds up to one gigabit per second.

"FC-1" defines the Fibre Channel transmission protocol which includes the serial encoding, decoding, and error control.

"FC-2" defines the signaling protocol which includes the frame structure and byte sequences.

"FC-3" defines a set of services which are common across multiple ports of a node.

"FC-4" is the highest level in the Fibre Channel standards set. It defines the mapping between the lower levels of the Fibre Channel and the IPI and SCSI command sets, the HIPPI data framing, IP, and other Upper Level Protocols (ULPs).

A "fabric" (sometimes referred to as a switch or router) is an entity which interconnects various N_Ports attached to it and is capable of routing frames by using the Destination Identifier (D_ID) information in the FC-2 frame header.

An "intelligent bridging hub" is a hub with one or more ports which implement ALPA filtering and/or routing functions and contains control logic.

A "FC-PLD-IS" or Fibre Channel Private Loop Device Interconnect System is a fabric or intelligent bridging hub, or a device which achieves the functionality of these devices.

A "RAID" or redundant array of inexpensive disks storage device is an interleaved storage technique which speeds access to disks along with implementing redundant storage access methods.

A "JBOD" or Just A Bunch Of Disks is a storage subsystem composed of a series of disks. A JBOD is similar to a RAID system without the RAID controller which implements the RAID striping and mirroring features.

"Topology" is an interconnection scheme that allows multiple Fibre Channel ports to communicate. For example point-to-point, Arbitrated Loop and fabric-attached are all Fibre Channel topologies.

"Fabric topology" is a topology where a device is directly attached to a fabric and that uses the Destination Identifier (D_ID) embedded in the frame header to route the frame through a Fabric to the desired destination N_Port.

"Point-to-point topology" allows communication between two N_Ports without the use of a Fabric.

"Arbitrated Loop topology" permits two or more L_Ports to communicate using arbitration to establish a point-to-point circuit. When two L_Ports are communicating, the Arbitrated Loop topology supports simultaneous, symmetrical bidirectional data flow.

"Stealth Mode" is a fabric or intelligent bridging hub mode of operation which allows the interconnection of private loop devices over multiple fabric/hub ports.

"Port" is a generic reference to an N_Port or F_Port.

"Link Control Facility" is a facility which attaches to an end of a link and manages transmission and reception of data. It is contained within each Port type.

An "N_Port" is a hardware entity which includes a Link Control Facility.

An "NL_Port" is an N_Port that contains Arbitrated Loop functions associated with Arbitrated Loop topology.

An "F_Port" is a generic reference to an F_Port or FL_Port.

An "FL_Port" is an F_Port that contains Arbitrated Loop functions associated with Arbitrated Loop topology.

An "L_Port" is an N_Port or F_Port that contains Arbitrated Loop functions associated with Arbitrated Loop topology.

A "Node" is a collection of one or more N_Ports controlled by a level above FC-2.

A "frame" is an indivisible unit of information used by FC-2.

"Classes of Service" are different types of services provided by the Fabric and used by the communicating N_Ports.

"Class 1" service is a service which establishes a dedicated connection between communicating N_Ports.

"Class 2" service is a service which multiplexes frames at frame boundaries to or from one or more N_Ports with acknowledgment provided.

"Class 3" service is a service which multiplexes frames at frame boundaries to or from one or more N_Ports without acknowledgment.

A "Gigabit Link Module" is a module which interfaces to the Endec through either a 10-bit or 20-bit interface and interfaces to the Fibre Channel link through either a copper or fiber interface.

An "Encoder/Decoder" or Endec is a device which implements the FC-1 layer protocol.

"Fabric Login Protocol" is when an N_Port interchanges Service Parameters with the Fabric by explicitly performing the Fabric Login protocol or implicitly through an equivalent method not defined in FC-PH.

"Private Loop Device" is a device which does not attempt a fabric login (FLOGI) ELS command and cannot open a fabric port, e.g., ALPA zero, when the domain and area addresses of a frame to be transmitted is not equal to zero.

"Public Loop Device" is a device which attempts fabric login and can communicate with devices that contain nonzero domain and area address values. Public loop devices can observe the rules of either public or private loop behavior. A public loop device may communicate with both private and public loop devices.

"Private Loop Direct Attach" or PLDA is a technical report which defines a subset of the relevant standards suitable for the operation of peripheral devices such as disks on a private loop.

"N_Port Login" or PLOGI is a Fibre Channel Extended Link Service Command defined in the FCPH Revision 4.3 ANSI standard that requests transfer of Service Parameters from the initiating N_Port/NL_Port to the N_Port/NL_Port or F_Port/FL_Port associated with the Destination Identifier.

"World-wide Name" or WWN is an 8-byte field which uniquely identifies an N_Port or F_Port. Each N_Port or F_Port must have a WWN which is unique worldwide.

"N_Port Identifier" is a 3-byte native address field which is unique within the Fibre Channel address domain.

"Source Identifier" or S_ID is the address identifier used to indicate the source Port of the transmitted frame.

"Destination Identifier" or D_ID is the address identifier used to indicate the targeted destination of the transmitted frame.

"Link Services Reject" or LS_RJT is a Fibre Channel Extended Link Service Command defined in the FCPH Revision 4.3 ANSI standard that notifies the transmitter of a Link Service request that the Link Service request Sequence has been rejected. LS_RJT frames may be transmitted for a variety of conditions which may be unique to a specific Link Service Request.

"Loop Initialization" is a protocol used to initialize the loop prior to beginning loop operations or when configuration changes are detected.

"Loop Initialization Primitive" or LIP frames are used to accomplish loop initialization.

"Loop Initialization Select Master" or LISM frame contains the devices World-wide unique name (WWN). The device with the lowest WWN becomes the temporary loop master during the loop initialization sequence.

"Loop Initialization Fabric Address" or LIFA loop primitive allows public ports that had logged-in with the fabric to reclaim the ALPA they had been using immediately prior to loop initialization. The LIFA is the first loop primitive transmitted by the temporary loop master which contains ALPA information.

"Loop Initialization Report Position" or LIRP loop primitive is used to build a map of all loop devices relative to the loop master. This primitive is optional in loop initialization.

"Loop Initialization Loop Position" or LILP loop primitive allows any interested device on the loop to view the current loop map. This primitive is optional in loop initialization.

"Jitter" is random variation in the timing of a signal, especially a clock.

B. STEALTH MODE FEATURES & FUNCTIONS

Figure 24:
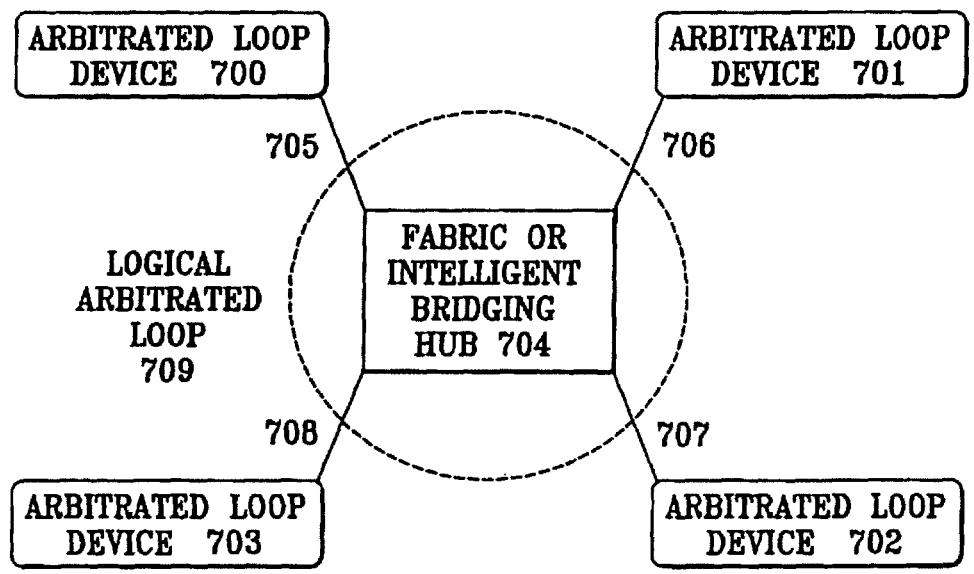
FIG. 24 is a diagram illustrating the relationship between a logical Arbitrated Loop and a physical Arbitrated Loop. The physical Arbitrated Loop is segmented over a fabric or an intelligent bridging hub.

The Stealth Mode is a combination of features and functions applied to a fabric or an intelligent bridging hub which allows it to interconnect private loop devices between ports on the fabric or hub, preferably without the private loop device's knowledge. The result of this mode allows one logical Arbitrated Loop to be segmented into multiple physical loops. As shown in FIG. 24 a logical loop 709 of Arbitrated Loop devices 700, 701, 702, 703 is connected physically 705, 706, 707, 708 to a fabric or intelligent bridging hub 704.

This segmentation solves some or all of the problems inherent in Arbitrated Loop topologies, such as:

Multiple loops allow more than two devices to communicate simultaneously, thereby increasing the bandwidth of the entire logical loop. As shown in FIG. 2, Host number 41 and JBOD 43 can simultaneously communicate 45 while Host number 42 and RAID 44 communicates 46.

Figure 4:
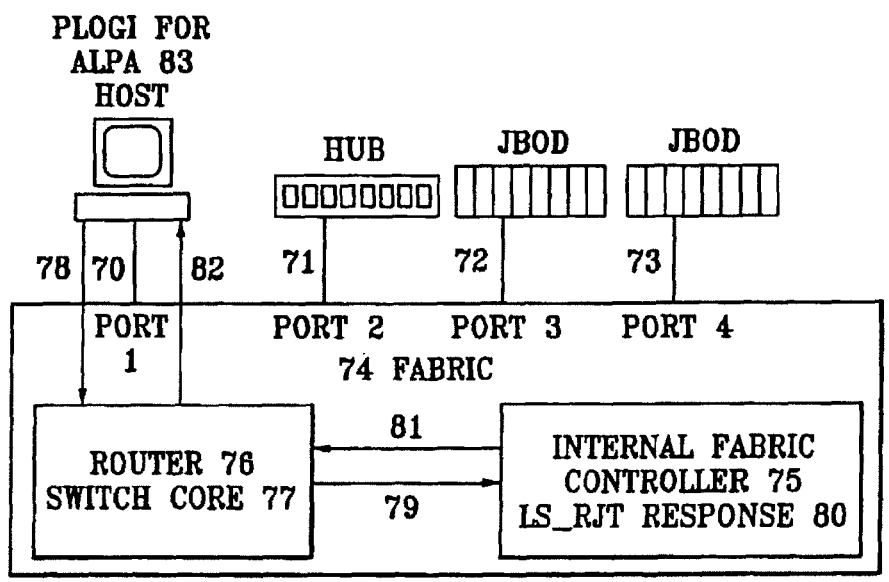
FIG. 4 is a block diagram showing the Stealth Mode procedure for routing Fibre Channel SCSI Initiator PLOGI I/O probes which do not correspond to an existent ALPA.

When a private loop device powers up or down or resets, only the port in which that device is connected is affected (except for certain conditions, see Resetting Host Ports Upon Storage Addition section, below). In FIG. 4, if the Host connected to port 1 numeral 70 powers down, only that port is affected. The loop state of the devices connected to ports 2, 3 and 4 are all unaffected.

Jitter is not additive for the entire logical loop, just the physical loop directly attached to the fabric port.

Device buffering delay is minimized since there are less devices per physical loop. As shown in FIG. 3 each device on the loop adds six words of buffering and associated delay 51, 52, 53 and 54.

Delay introduced from interdevice distance is minimized since the delay will only affect the devices on the single fabric port. As shown in FIG. 3 the distance between devices 59, 60, 61, 62 creates an additive delay.

Existing Fibre Channel SCSI Initiator and IP (Internet protocol) software drivers and Fibre Channel native disk drive firmware do not have to be modified.

Some or all of the following features are implemented by the fabric or intelligent bridging hub to create the Stealth Mode.

The fabric port looks to the loop devices as a device with a large amount of ALPAs. The fabric accomplishes this by applying a routing filter to the incoming ALPAs.

The fabric predetermines the ALPA range available for each port and forces the connected devices to choose that ALPA range during loop initialization to simplify system routing.

Upon initialization the Fibre Channel SCSI Initiators send out PLOGI I/O probes to all ALPAs to find any attached SCSI devices. The fabric routes the I/O probes to actual attached SCSI devices and redirects those I/O probes to nonexistent ALPAs to the fabric controller where they are responded to.

The fabric may reset host ports when storage is added to a fabric port to initiate Fibre Channel SCSI Initiator PLOGI I/O probing.

Block transmission of the LIRP and LILP frames during loop initialization in case host driver software modifies its PLOGI I/O probing based on the ALPA map information contained in those frames.

While a majority of the description in this application describes the implementation via a Fibre Channel fabric, because that is our preferred embodiment, the inventions are equally applicable to Intelligent Bridging hubs or any Fibre Channel private loop device interconnect system.

C. BACKGROUND—FIBRE CHANNEL FABRIC MODEL

Figure 13:
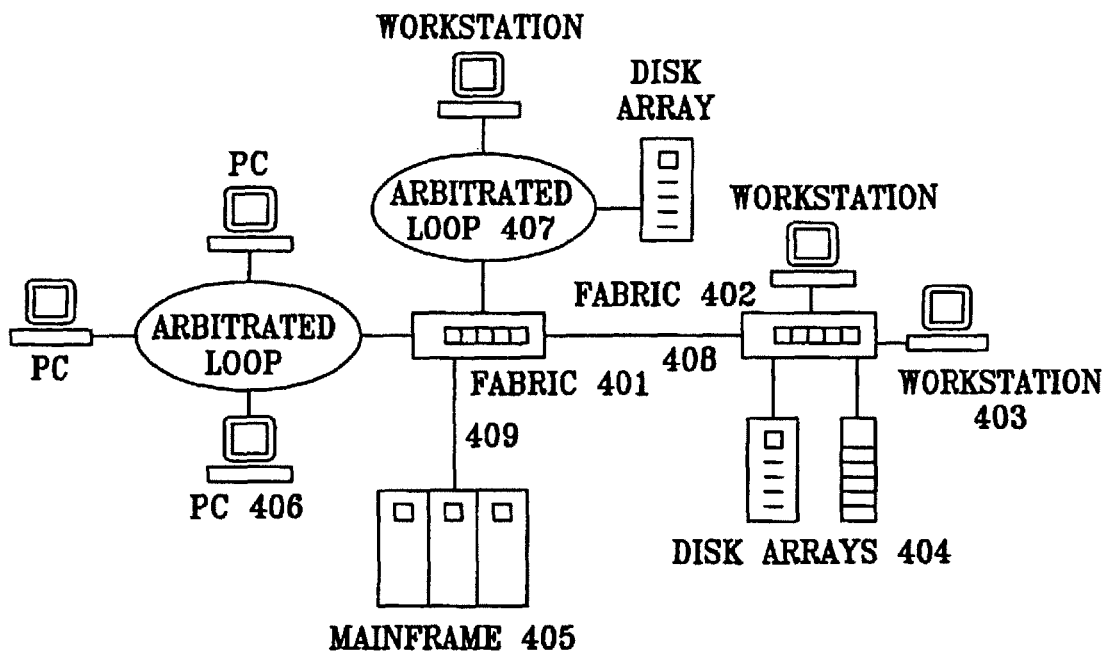
FIG. 13 is a block diagram illustrating the use of a Fibre Channel Fabric.

As shown in FIG. 13, a Fibre Channel Fabric is an entity which transports Fibre Channel frames between attached devices. The data transmission between the connected device port (i.e., N_Port) and the Fabric port (i.e., F_Port) is serial and consists of one or more frames. The transmission protocol and speeds along with the fabric functionality are defined in the American National Standard for Information Systems (ANSI) FCPH standard (see Other Documents section, below).

A primary function of the Fabric is to receive frames from a source N_Port and route the frames to the destination N_Port whose address identifier is specified in the frames. Each N_Port is physically attached through a link to the Fabric or in the case of an Arbitrated Loop topology attached to the same loop. FC-2 specifies the protocol between the Fabric and the attached N_Ports. A Fabric is characterized by a single address space in which every N_Port has a unique N_Port identifier.

The Fabric model contains three or more F_Port or FL_Ports. Each F_Port is attached to an N_Port through a link. Each F_Port is bidirectional and supports one or more communication models. The receiving F_Port responds to the sending N_Port according to the FC-2 protocol The Fabric may or may not verify the validity of the frame as it passes through the Fabric. The Fabric routes the frame to the F_Port directly attached to the destination N_Port based on the N_Port identifier (D_ID) embedded in the frame. The address translation and the routing mechanisms within the Fabric are transparent to N_Ports.

FIG. 13 shows a possible environment containing a Fibre Channel fabric. The fabric is identified by the reference numerals 401 and 402. The fabrics illustrated are connected with a mix of workstations 403, disk arrays 404, mainframe computers 405, and Personal Computers (PC) 406. Fabric interconnection is not limited to particular equipment or a network topology as illustrated in FIG. 13. Two types of fabric topologies are illustrated in FIG. 13, the direct fabric attached topology 409 and the Arbitrated Loop topology 407. The fabrics in FIG. 13 are shown interconnected or networked through a link 408. All links to the fabric can operate at either 266 Mbps, 533 Mbps or 1.063 Gbps speeds and operate over either copper or fiber media.

FIG. 14 shows a block diagram of the fabric. The fabric is composed of a fabric control module 454, a router module 452, multiple port control modules 451, 474, 475 a switch core module 453 and optionally one or more brouter modules 455. The Fabric Control module controls and configures the rest of the fabric but is not usually involved in the normal routing of frames. The fabric Router 452 performs route address matching, route determination based on the ANSI X3T11 rules, route request blocking & unblocking, switch core programming 463, statistics collection and port control module route request/response handling 459, 460, 461, 462, 466, 467, 472, 473. The fabric Port Control modules (PCM) 451, 470, 474, 475 receive Fibre Channel frames from the fiber or copper media 456, 477, 478, perform frame validation, send a route request to the router 459, 461, 466, 472, receives a route response from the router 460, 462, 463, 467, 473, forwards the frame to the switch core 457, 469, and either discards the frame, modifies the frame into a fabric reject (F_RJT) or fabric busy (F_BSY) frame or forwards the frame depending on the route response from the router. The fabric switch core 453 is a nonblocking N×N matrix switch with 36 bit wide transmit and receive I/Os. The switch core switches frames from the PCMs 451, 470, 474, 475 to the destination PCMs or Brouter Module.

1. Fabric Control Module

Figure 15:
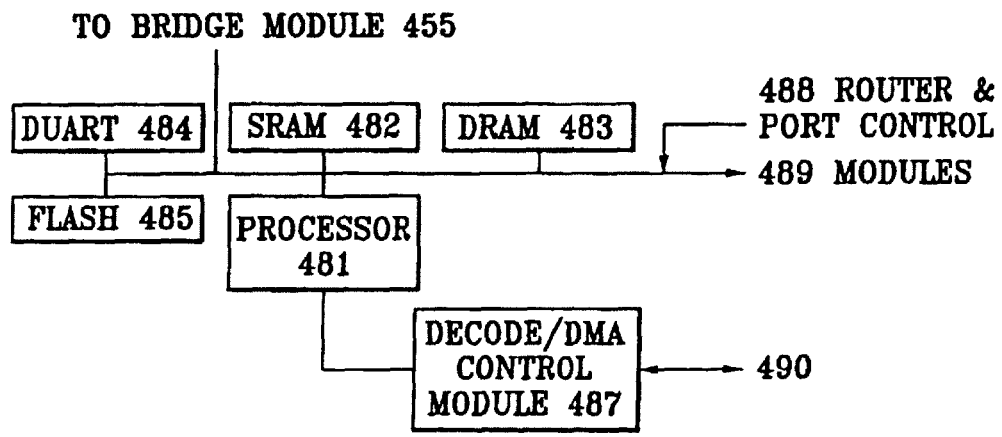
FIG. 15 is a block diagram of the Fabric Control module.

FIG. 14 shows the Fabric Control module (FCM) 454. The FCM configures the fabric, collects and reports network management parameters and implements the fabric defined servers such as the Simple Name Server, Directory Services, etc. The FCM configures the router 452, the port control modules 451, 474, 475 and the brouter module 455. FIG. 15 shows the Fabric Control module (FCM) in more detail. The FCM is made up of fast SRAM 482, DRAM 483, a DUART 484, flash memory 485 (nonvolatile storage), a processor 481 and a Decode/DMA Control module 487. The code for the processor is contained in the flash memory 485 and is copied to SRAM upon bootup. The interface to the brouter module 455 allows the FCM to communicate through legacy networks such as ethernet and fast ethernet, depending on the brouter module.

2. Fabric Router

The Fabric Router, FIG. 14 numeral 452 receives route requests generated from the Port Control modules 459, 461, 466, 472, determines the frame route, reports the route responses to the Port Control modules 460, 462, 467, 473, programs the switch core to connect and disconnect the routes 463, manages blocked route requests and collects the routing statistics. There is one central router contained in a fabric. The Router connects and disconnects routes on a frame by frame basis. Since the router can determine a route in real time (i.e., Fibre Channel frame time) the Fabric can support Class 1 frames. The router is realized in hardware through either an FPGA or a custom ASIC. The router is composed of thirteen functional modules as illustrated in FIG. 16:

Port Control Route Request Interface (PCRRIM) 530
Port Control Route Response Interface (PCRSPM) 544
Address Table 532
Address Match Module (ADM) 531
Blocked Route Request Table Module (BRTBL) 533
Blocked Route Request Port Register Array (BRRA) 534
Blocked Route Request Timer (BRTMR) 535
Route Request Unblock Determination Module (RRUNB) 536
Route Request Selector (RRS) 537
Route Determination Module (RDM) 538
Route State Table (RST) 539
Router Statistics Gathering Module (RST) 541
Router Control FSM (RCFSM) 540.

a. Address Table

The Address Table is shown in FIG. 16 numeral 532. The address table is initially configured by the processor in the fabric control module 522. The Address Table contains entries against which the incoming Fibre Channel frame destination identifier (D_ID) is compared. The address entry contains a twenty four bit address mask register along with a twenty four bit address register. The incoming D_ID is ANDed with the address mask register and the result is compared to the address register. This allows a match to be performed on any number of bits in the address. This also implements routing based on any combination of the address domain (upper eight bits of the address field), area (middle eight bits of the address field) or port (lower eight bits of the address field) fields. Additional address fields include the destination port and the address priority fields. The destination port indicates which remote F_Port to route the frame to and the address priority field specifies a priority for this address table entry match. For any two address matches the address table entry match which is the highest priority will be used. This implements alternate routing in case of port failure feature.

b. Address Match Module

The Address Match module (ADM) is shown in FIG. 16 numeral 531. The ADM performs the comparison with the incoming frame D_ID address from the route request 505 with the Address Table contents 509. The results are used by the Route determination module 538. The ADM has as an input the twenty-four bit address to match, i.e., the incoming frame D_ID address from the route request, and returns the following responses: the remote match port, the address matched indication and the route to control module indication. The ADM will match an incoming D_ID address to all the addresses in the address table in one clock. The ADM logic is implemented in combinatorial logic. The ADM performs the following checks for each address table entry:
Address Match indication=(address in table==(address mask & D_ID))

The results are then priority decoded based on address priority contained in the address table and the resulting address match signal and port are generated. There is one special mode which is implemented which will preemptively route all frames to the Fabric Control module except frames originating from the Fabric Control module. This allows the fabric control module to process all incoming frames which is useful when the fabric is functioning in certain environments.

c. Route Determination Module

FIG. 16 numeral 538 shows the Route Determination module (RDM). The RDM applies rules defined in the ANSI Fibre Channel specifications to calculate how to route the incoming frame. The RDM receives the route request 510 from the RRS 537 along with route context for the source and destination ports 512 from the Route State Table 539. The RRS outputs the route results 545, 511 to both the Router Control FSM 540 and the PCRSPM 544. The RDM is implemented in combinatorial logic and applied the route rules in one clock.

3. Switch Core

FIG. 14 shows the Switch Core. The switch core implements a nonblocking N×N matrix switch. The input to the switch core comes from the individual Port Control modules FIG. 14 numerals 457 and 469. The output from the switch core is wired to the Endec FIG. 14 numeral 458 and the Brouter Module FIG. 14 numeral 476. The switch core is paths are setup and torn down by the router FIG. 14 numeral 463.

4. Port Control Module

FIG. 14 shows the Port Control (PC) locations 451, 470, 474, 475, within the fabric block diagram. There is one PC per port or link. The PC interfaces with the fabric attached device through either copper or fiber media 456, 477, 478. The PC interfaces to the switch core through transmit 458 and receive 457 data buses and control signals. The PC interfaces to the router through route request 459, 461, 466, 472 and route response 460, 462, 467, 473 buses and control signals. Finally the PC interfaces to the Fabric Control module through a processor interface bus 465.

FIG. 17 shows the Port Control in more detail. Frames are received from the fiber or copper link 551 and enter the Endec 553. The Endec implements the 8B/10B encoding/decoding, the loop port state machine and fabric/point-to-point state machine functions and outputs thirty two bit data words with two bits of parity and tag information to the receive FIFO 555. The PC contains a module which guards against a receive FIFO overrun 154 condition. Once the receive FIFO 555 starts filling, the Port Control Module (PCM) 556 reads the frame header, requests a route from the router 563, 564 and forwards the frame to the switch core 561, 562. The PCM is configurable by the processor 570 in the Fabric Control module. The Port Control also receives frames from the switch core 565, 566 to be transmitted by the Endec 553.

D. BACKGROUND—INTELLIGENT BRIDGING HUB

An intelligent bridging hub is a device composed of one or more passive hubs interconnected by some additional logic to bridge between two or more Fibre Channel Arbitrated Loops. An intelligent bridging hub can implement the Stealth routing mode if it contains the following functionality:

Route filtering for two or more hub submodules
Basic routing between hub submodules
Minimum processor functions to "spoof" the PLOGI I/O probes and participate in loop initialization.

Figure 25:
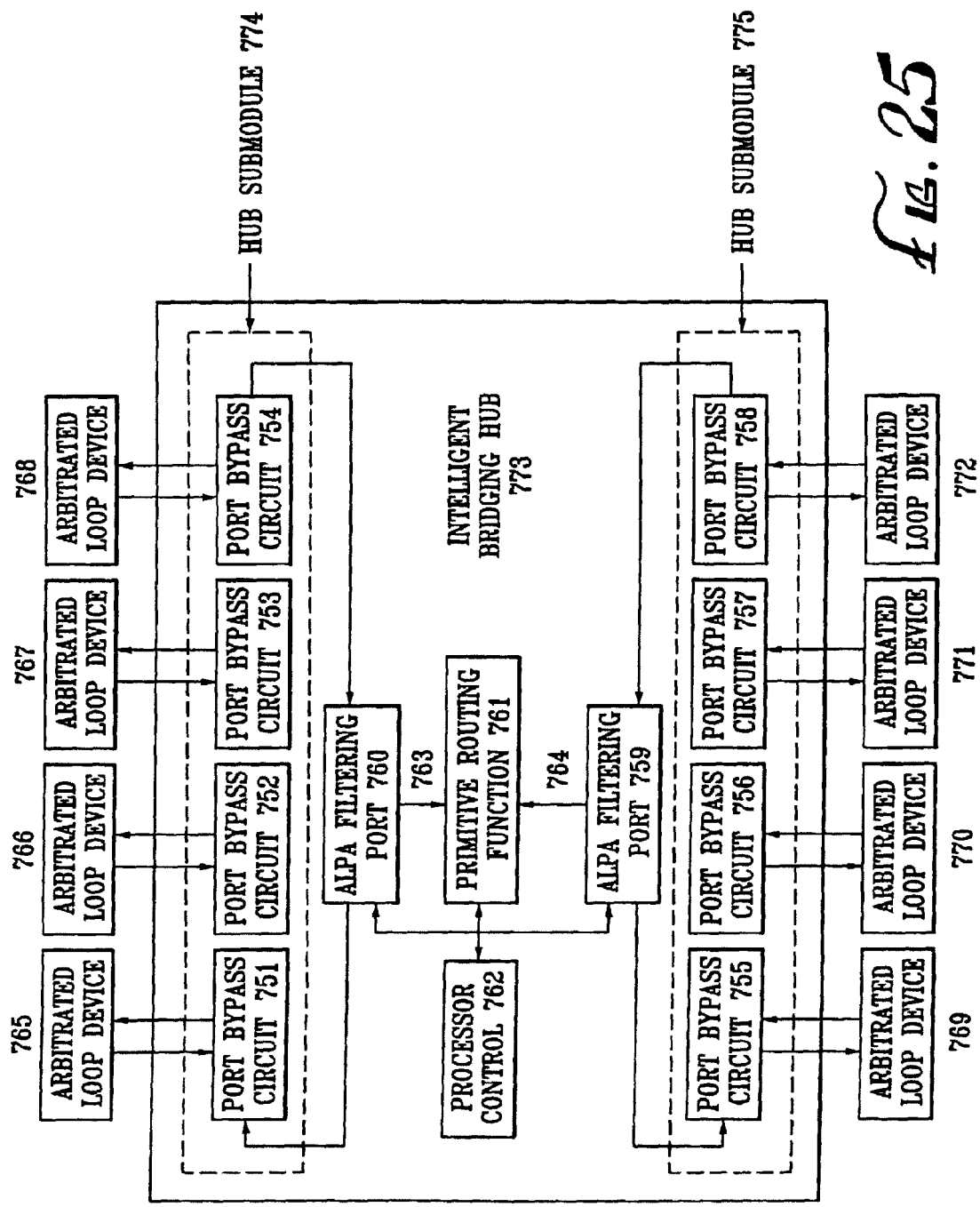
FIG. 25 is a block diagram of an intelligent bridging hub.

A block diagram of an intelligent bridging hub is shown in FIG. 25. As shown in FIG. 25, the intelligent bridging hub 773 is composed of two or more hub submodules 774, 775 containing a route filtering port 759, 760, some logic to perform limited routing 761 and a processor 762 to perform loop initialization and some other stealth features. Each hub submodule contains port bypass circuits 751 through 758 or their equivalent.

E. ALPA FILTERING

To receive frames for attached physical Arbitrated Loop segments the fabric port implements receive frame ALPA range filtering. This filtering function is done in the encoder/decoder module, see FIG. 17 numeral 553 of the port control logic, FIG. 14, numerals 451, 474, 475. As each frame is received, the fabric port applies a mask to the received ALPA (Arbitrated Loop Physical Address) and compares it with a preconfigured value. Depending on the "receive on match/no match" bit the fabric will receive the frame on a resultant match or no match. This algorithm is shown below.

```
if (((received frame ALPA & mask) == predetermined address) ==
    (match/no match))
        receive frame
else
        forward frame to next device
```

The receive frame on match/no match bit is used to allow greater filtering flexibility of incoming frames. An example of this filtering is shown by the following example. Assume there is one private loop device attached to the fabric port and its ALPA is 17h (where h means hexadecimal notation). To route all frames from this device to the fabric the fabric mask would be 00, the predetermined address would be 00h and the port would receive frame "on match". This has the affect of filtering, i.e., receiving, all frames transmitted from the attached device.

Another example would be a hub connected to a fabric port with attached hub device ALPAs of B1h, B2h, B3h, B4h, B5h, B6h, B9h, BAh, BCh. The fabric mask would be F0, the predetermined address would be B0h and the port would receive frame on "no match". The result would have the fabric port receiving all frames that do not contain B in bits 7 to 4 of the ALPA.

There can be multiple ALPA filters per port. An example would be a port with a fabric mask of F0 and a predetermined address of both 20h and 40h. If the mask algorithm returns a positive result when applied to any of multiple filters for a single port (i.e., an OR result) the frame is forwarded on the local loop and not filtered.

While the preceding description is of the preferred embodiment, you can still achieve some of the benefits of the invention without the capability of a settable match/no match bit. Even if you do not support a match/no match bit you can still support numerous topologies of interconnected Arbitrated Loops composed of private loop devices with a fabric or intelligent bridging hub.

F. PORT ALPA RANGE CONFIGURATION

In order to support the Stealth Mode the fabric must have a priori knowledge of the device ALPA ranges on each port.

This is accomplished by the fabric by forcing the attached devices to choose a predetermined ALPA range. This is done during the LIFA loop initialization phase. The fabric reserves all ALPAs in the LIFA bit map, see FIG. 18 numeral 600, by setting them equal to 1, except the range that the fabric desires the port to choose from. FIG. 19 shows the ALPA bit map 601 to exclude all ALPAs from being chosen from the attached devices except 10, 17, 18, 1B, 1D, 1E or 1F.

The fabric is guaranteed to generated the LIFA by becoming loop master in the LISM phase. The fabric does this by choosing the lowest World-wide name, i.e., zero in the LISM frame, see FIG. 20 numeral 610.

G. FIBRE CHANNEL SCSI INITIATOR I/O PROBE SPOOFING

Private loop Fibre Channel SCSI Initiator devices send out N_Port Logins (PLOGI) to the entire ALPA range after loop initialization to probe for SCSI devices. The PLOGIs are transmitted serially. After each PLOGI transmission the Fibre Channel SCSI Initiator waits for each reply before sending another PLOGI. If the host driver receives the PLOGI it has just sent that indicates there are no devices on the loop with the ALPA.

Since a fabric in the Stealth Mode is filtering and routing frames off the local Arbitrated Loop, in many cases the Fibre Channel SCSI Initiator will not receive its own PLOGIs destined for nonexistent ALPAs and will timeout before sending another one. Since this timeout can be up to ten seconds and there are 126 possible devices on a loop the initialization time is not acceptable unless the fabric acts on the PLOGI frame.

In the Stealth Mode the fabric is optimized to automatically route the PLOGIs destined to nonexistent ALPAs to the fabric controller which will return an immediate response. The ANSI FCPH standard requires all Class 3 frames which are not deliverable to be discarded. In the Stealth Mode the fabric deviates slightly from the ANSI standard and routes Class 3 frames to be discarded to the internal fabric controller.

If the frames received by the fabric controller are Class 3 PLOGI frames (i.e., Fibre Channel SCSI Initiator I/O probes) the fabric element will return a Link Services Reject (LS_RJT) to indicate that the exchange is not to be setup. All other Class 3 frames will be discarded by the fabric element satisfying the ANSI FCPH standard. This satisfies the requirement to return a frame to the PLOGI in real time to avoid PLOGI timeout.

Two modifications of the fabric router are necessary to handle PLOGI probes to nonexistent ALPAs. The first modification is to route all rejected Class 3 frames to the fabric controller. As shown in FIG. 4, all PLOGI's 78 which should be discarded by the router 76 due to the destination being nonexistent are routed to the fabric controller 75. The fabric controller generates an LS_RJT (Extended Link Services Reject) frame 80, 81 for every Class 3 PLOGI frames it receives. The LS_RJT frame is routed back to the originating port 82 to expedite the PLOGI probing phase.

Figure 5:
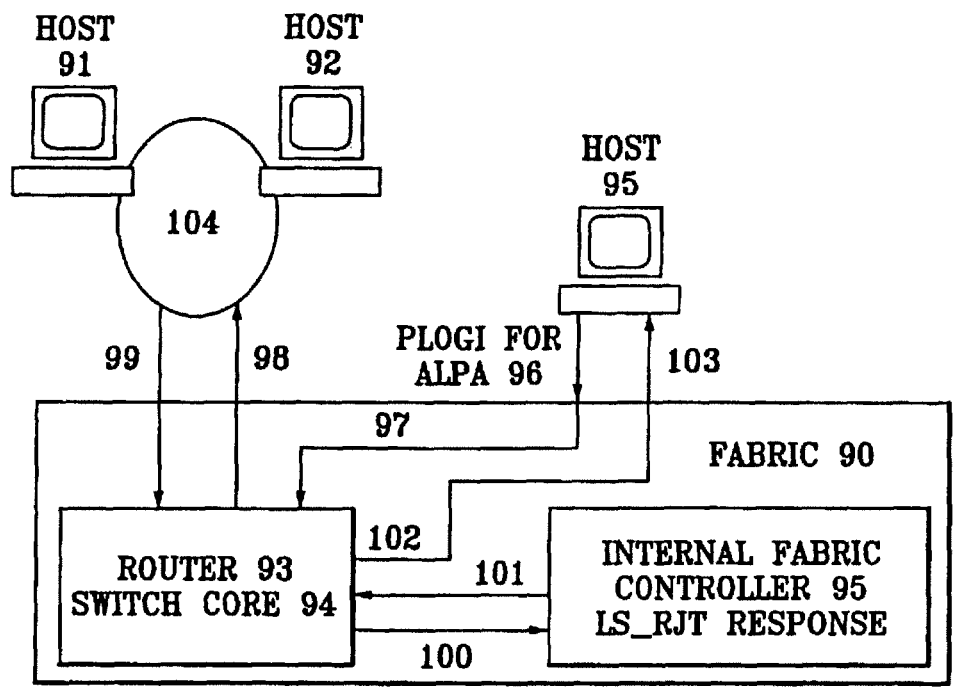
FIG. 5 is a block diagram showing the fabric router modifications necessary to route Fibre Channel SCSI Initiator PLOGI I/O probes which do not correspond to an existent ALPA.

The second modification is to route all Class 3 frames which were transmitted and received back from a loop (i.e., no device present) to the fabric controller. As shown in FIG. 5 if a PLOGI is generated from a loop 96 and routed to a destination loop 97, 98 which does not contain a device which matches the ALPA, it is received by the router 93 and routed to the fabric controller 95. As in the previous case the fabric controller 95 generates an LS_RJT (Extended Link Services Reject) frame 101 for every Class 3 PLOGI frames it receives. That frame is routed back to the originating port 102, 103 to expedite the PLOGI probing phase.

H. RESETTING HOST PORTS UPON STORAGE ADDITION

Fibre Channel SCSI Initiators only I/O probe with PLOGI frames whenever the loop is reset. If private loop storage devices are added to remote fabric ports in a Stealth Mode environment after private loop Fibre Channel SCSI Initiators are initialized, they will have missed the PLOGI I/O probe phase and will not be "seen" by the SCSI Initiators. Fibre Channel SCSI Initiators must be notified of the addition of the storage device so as to reinitiate I/O probing with PLOGI frames. In the Stealth Mode the fabric implements an option to reset ports, i.e., transmit LIP, which have hosts attached if a port with storage is added.

I. DEFAULT ROUTE CONFIGURATION

The Stealth Mode requires the ALPAs for the devices attached to the fabric port to be predetermined in order to simplify fabric routing. The fabric enforces this configuration by generating special LIFA frames during loop initialization, see Port ALPA Range Configuration Section. The strategy is to allocate numerically similar ALPA ranges to fabric ports to simplify routing. The ALPA ranges are chosen based on the number of ALPAs in certain ranges. ALPA ranges are defined as 1x, 2x, 3x, 4x, 5x, 6x, 7x, 8x, 9x, Ax, Bx, Cx, Dx and Ex, where x is ALPA bits 3 to 0, and represents a don't care value. Note that all numbers are in hexadecimal notation. Since the ALPA values are not contiguous, ALPA range selection must be done carefully. The table below organizes the ALPA values into ranges and shows the number of available ALPA addresses in each range.

| ALPA Values | Number of Addresses in Range |
| --- | --- |
| 00 | 1 |
| 01, 02, 04, 08, 0F | 5 |
| 10, 17, 18, 1B, 1D, 1E, 1F | 7 |
| 23, 25, 26, 27, 29, 2A, 2B, 2C, 2D, 2E | 10 |
| 31, 32, 33, 34, 35, 36, 39, 3A, 3C | 8 |
| 43, 45, 46, 47, 49, 4A, 4B, 4C, 4D, 4E | 10 |
| 51, 52, 53, 54, 55, 56, 59, 5A, 5C | 9 |
| 63, 65, 66, 67, 69, 6A, 6B, 6C, 6D, 6E | 10 |
| 71, 72, 73, 74, 75, 76, 79, 7A, 7C | 9 |
| 80, 81, 82, 84, 88, 8F | 6 |
| 90, 97, 98, 9B, 9D, 9E, 9F | 7 |
| A3, A5, A6, A7, A9, AA, AB, AC, AD, AE | 10 |
| B1, B2, B3, B4, B5, B6, B9, BA, BC | 9 |
| C3, C5, C6, C7, C9, CA, CB, CC, CD, CE | 10 |
| D1, D2, D3, D4, D5, D6, D9, DA, DC | 9 |
| E0, E1, E2, E4, E8, EF | 6 |

Figure 22:
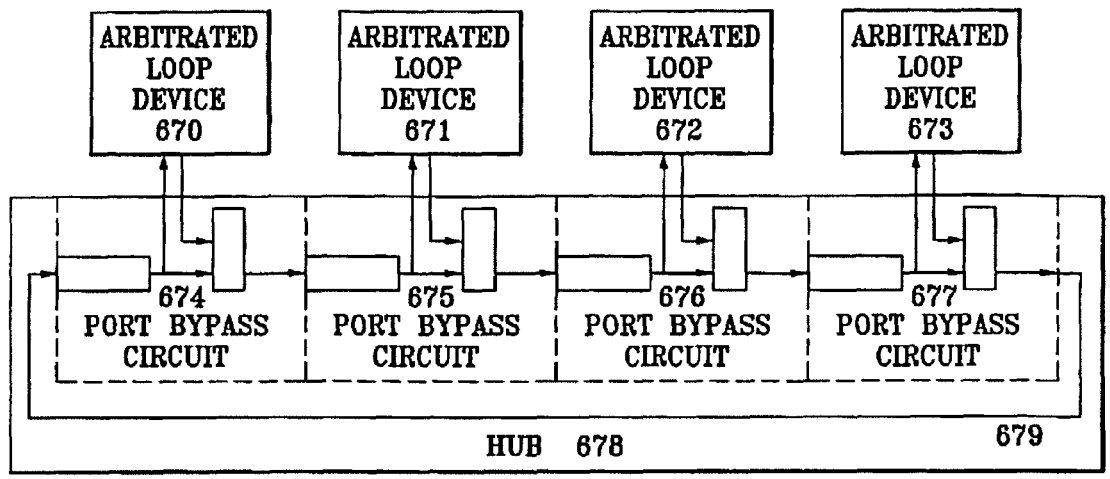
FIG. 22 is a block diagram of a four port Fibre Channel hub.
Figure 23:
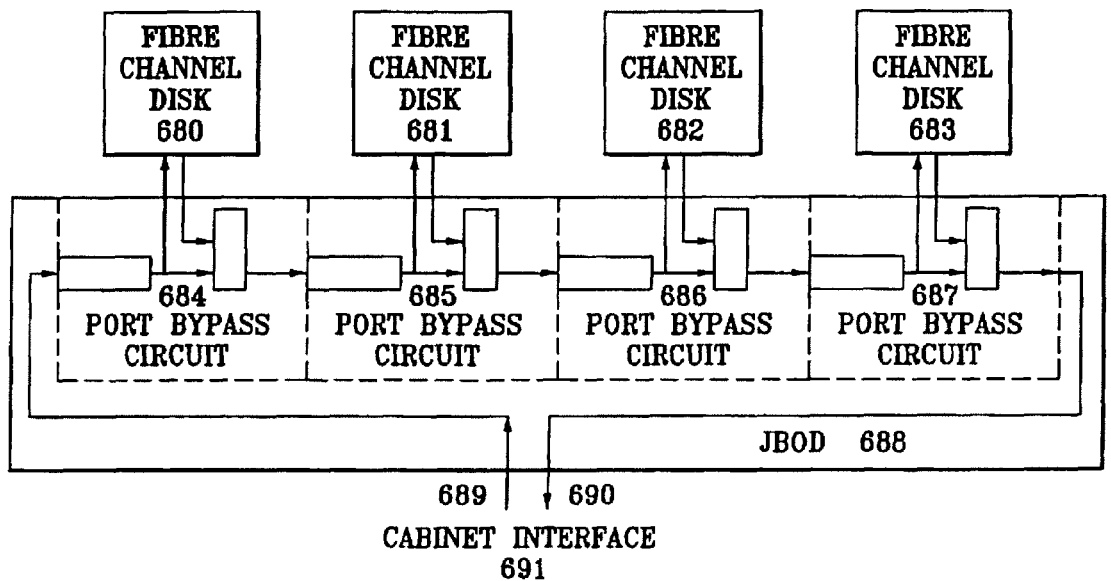
FIG. 23 is a block diagram of a JBOD (Just a Bunch of Disks) storage subsystem.

For example, JBOD (Just a Bunch of Disks) storage devices are typically composed of several Fibre Channel disk drives in a single 19" equipment rack mount enclosure, see FIG. 23. Each drive 680, 681, 682, 683 requires a separate ALPA. The ports which contain JBODs should use a range have enough ALPAs to assign to all drives. Hubs are another device which contain several addressable entities, see FIG. 22. Therefore only the ranges 2x, 3x, 4x, 5x, 6x, 7x, Ax, Bx, Cx and Dx can be assigned to ports which have JBODs, hubs or other fabrics attached. Hosts and RAID devices (Redundant Array's of Inexpensive Disks) only use one ALPA and can use any ALPA range. Fabric links use seven ALPAs and use ALPA ranges which contain seven or more ALPAs.

J. STEALTH LOOP TOPOLOGIES AND CONFIGURATION STRATEGIES

To take full advantage of the Stealth Mode all private loop devices should be connected to the fabric in such a way to expedite simultaneous communication between pairs of devices. When multiple devices must share fabric ports, similar devices should share the same loops to simplify the routing requirements. For example storage devices should share the same loop and fabric port(s).

There are a large number of topologies which are supported by the Stealth Mode. In addition all types of private loop devices are supported such as hosts, RAIDs, JBODs, hubs, SCSI-to-Fibre Channel bridges, tape drives, other fabrics, etc. Below are descriptions of several representative examples of the Stealth Mode topologies.

Figure 21:
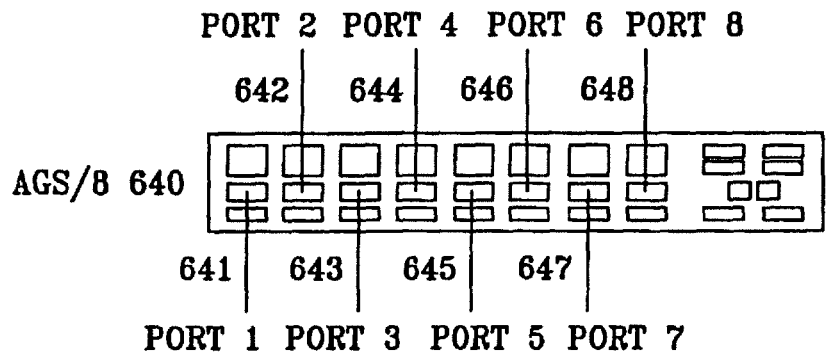
FIG. 21 is a block diagram of a fabric with eight ports, showing the port locations.

In all diagrams the fabric shown contains eight ports. As shown in FIG. 21, port 1 641 is on the far left hand side and port 8 648 is on the far right hand side of the fabric. The example topologies are representative but not exhaustive. The examples show a single line between the fabric and the attached device(s). The single line represents an Arbitrated Loop connecting the fabric to the attached device(s), except for fabric-to-fabric links which are point-to-point and not Arbitrated Loop. In many cases the loop is only composed of two devices, the fabric port and the attached device. Although the examples show an eight port fabric, higher or lower port size fabrics or intelligent bridging hubs may also be used.

FIG. 1 shows a fabric interconnecting a mix of private loop devices including: JBOD systems 3, 6, 9, a hub 16, hosts, RAID systems 19, 29, 36, in addition to other fabrics 2, 37. Note that all the links between the fabric and attached devices are Arbitrated Loops, there connection is shown by a single line. The fabric routing table for the AGS/8 1 fabric is shown below. Note the primary/backup column indicates whether the link should be used as the primary link or a backup link in case the primary link fails.

| Port | Device Type | Address | Mask | Primary/Backup |
| --- | --- | --- | --- | --- |
| 1 | JBOD, 2 racks 4, 5 | Ax, Cx | F0 | Primary |
| 2 | Hub 16 | 2x | F0 | Primary |
| 3 | JBOD, 2 racks 7, 8 | 4x, 6x | F0 | Primary |
| 4 | RAID 19 | 80 | FF | Primary |
| 5 | Host 20 | 81 | FF | Primary |
| 6 | JBOD, 5 racks 10, 11, 12, 13, 14 | 3x, 5x, 7x, Bx, Dx | F0 | Primary |
| 7 | Fabric link 21 | 9x | F0 | Primary |
| 8 | Fabric link 22 | 1x | F0 | Primary |

The port ALPA filtering table (i.e., of received frames) is shown below.

| Port | Device Type | Address | Mask | Filter on Match/No Match |
| --- | --- | --- | --- | --- |
| 1 | JBOD, 2 racks | Ax, Cx | F0 | No Match |
| 2 | Hub | 2x | F0 | No Match |
| 3 | JBOD, 2 racks | 4x, 6x | F0 | No Match |
| 4 | RAID | 80 | FF | No Match |
| 5 | Host | 81 | FF | No Match |
| 6 | JBOD, 5 racks | 3x, 5x, 7x, Bx, Dx | F0 | No Match |
| 7 | Fabric link | 9x | F0 | No Match |
| 8 | Fabric link | 1x | F0 | No Match |

Figure 6:
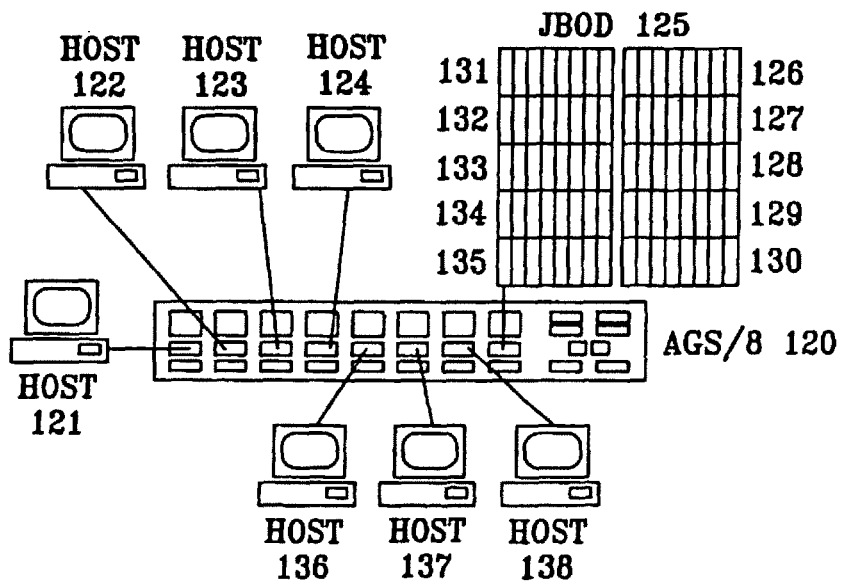
FIG. 6 is a block diagram showing the interconnection of seven host computers with ten racks of JBODs, each JBOD consisting of up to eight disk drives.

FIG. 6 shows a fabric interconnecting a mix of private loop devices including: JBODs and host devices on a single fabric. The fabric routing table for the AGS/8 120 fabric is shown below.

| Port | Device Type | Address | Mask | Primary/Backup |
| --- | --- | --- | --- | --- |
| 1 | Host 121 | 10 | FF | Primary |
| 2 | Host 122 | 17 | FF | Primary |
| 3 | Host 123 | 18 | FF | Primary |
| 4 | Host 124 | 1B | FF | Primary |
| 5 | Host 136 | 1D | FF | Primary |
| 6 | Host 137 | 1E | FF | Primary |
| 7 | Host 138 | 1F | FF | Primary |
| 8 | JBOD, 10 racks 126, 127, 128, 129, 130, 131, 132, 133, 134, 135 | Cx, Ax, 6x, 4x, 2x, Dx, Bx, 7x, 5x, 3x | F0 | Primary |

The port ALPA filtering table is shown below.

| Port | Device Type | Address | Mask | Filter on Match/No Match |
| --- | --- | --- | --- | --- |
| 1 | Host | 10 | FF | No Match |
| 2 | Host | 17 | FF | No Match |
| 3 | Host | 18 | FF | No Match |
| 4 | Host | 1B | FF | No Match |
| 5 | Host | 1D | FF | No Match |
| 6 | Host | 1E | FF | No Match |
| 7 | Host | 1F | FF | No Match |
| 8 | JBOD, 10 racks | Cx, Ax, 6x, 4x, 2x, Dx, Bx, 7x, 5x, 3x | F0 | No Match |

Figure 7:
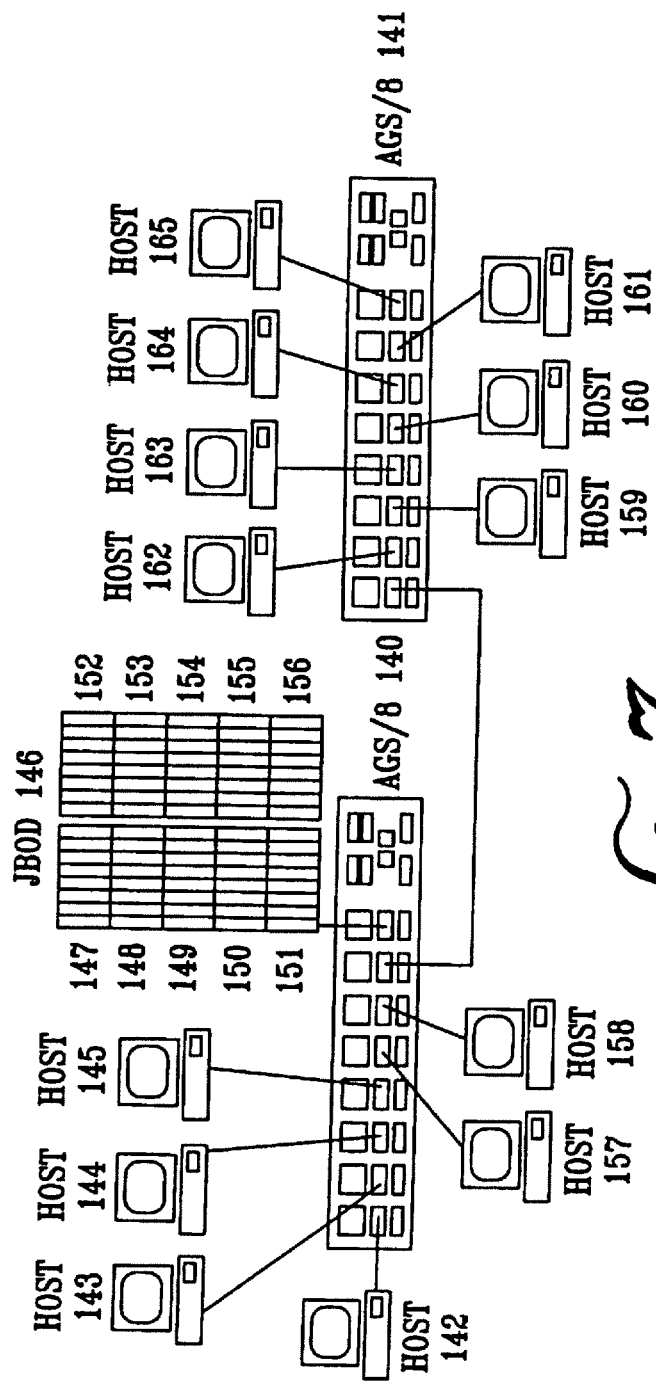
FIG. 7 is a block diagram showing the interconnection of thirteen host computers with ten racks of JBODS, each JBOD consisting of up to eight disk drives.

FIG. 7 replaces host port number 7 in FIG. 6 with a fabric 141 containing seven more hosts 159, 160, 161, 162, 163, 164, 165. The routing table is similar to FIG. 6 except the routing address for port 7 is 9x, the routing mask is F0, the ALPA filtering address is 9x and the ALPA filtering mask is F0.

Figure 8:
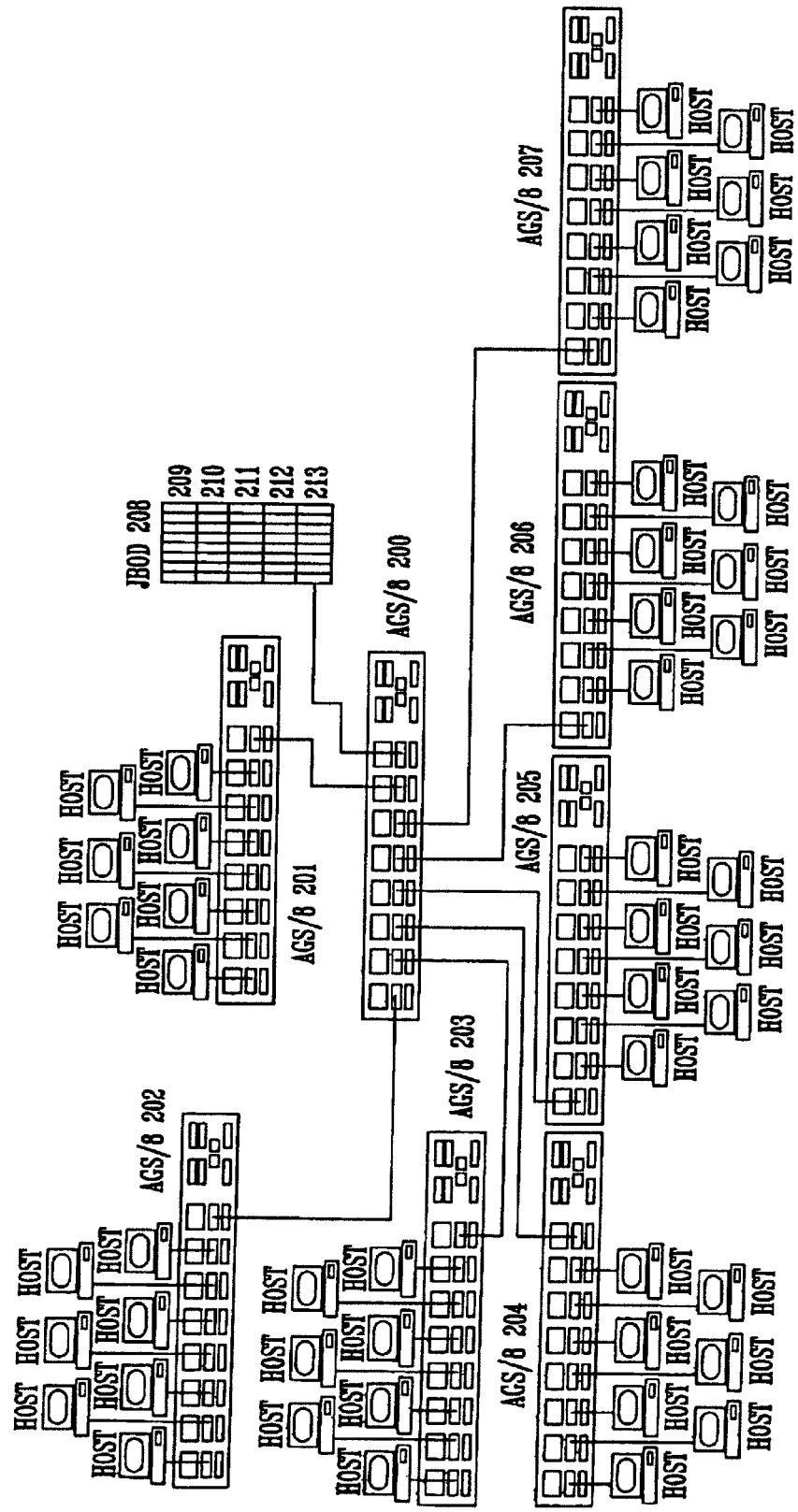
FIG. 8 is a block diagram showing the interconnection of forty nine host computers with five racks of JBODS, each JBOD consisting of up to eight disk drives.

FIG. 8 replaces all hosts in FIG. 6 with fabrics 201, 202, 203, 204, 205, 206, 207 with attached host devices. The ALPA ranges that the fabrics use are 1x, 9x, 3x, 5x, 7x, Bx and Dx. Because of limited ALPA ranges the maximum number of JBODs 208 in this configuration is five 209, 210, 211, 212, 213. The JBODs are assigned ALPAs of 2x, 4x, 6x, Ax and Cx.

Figure 9:
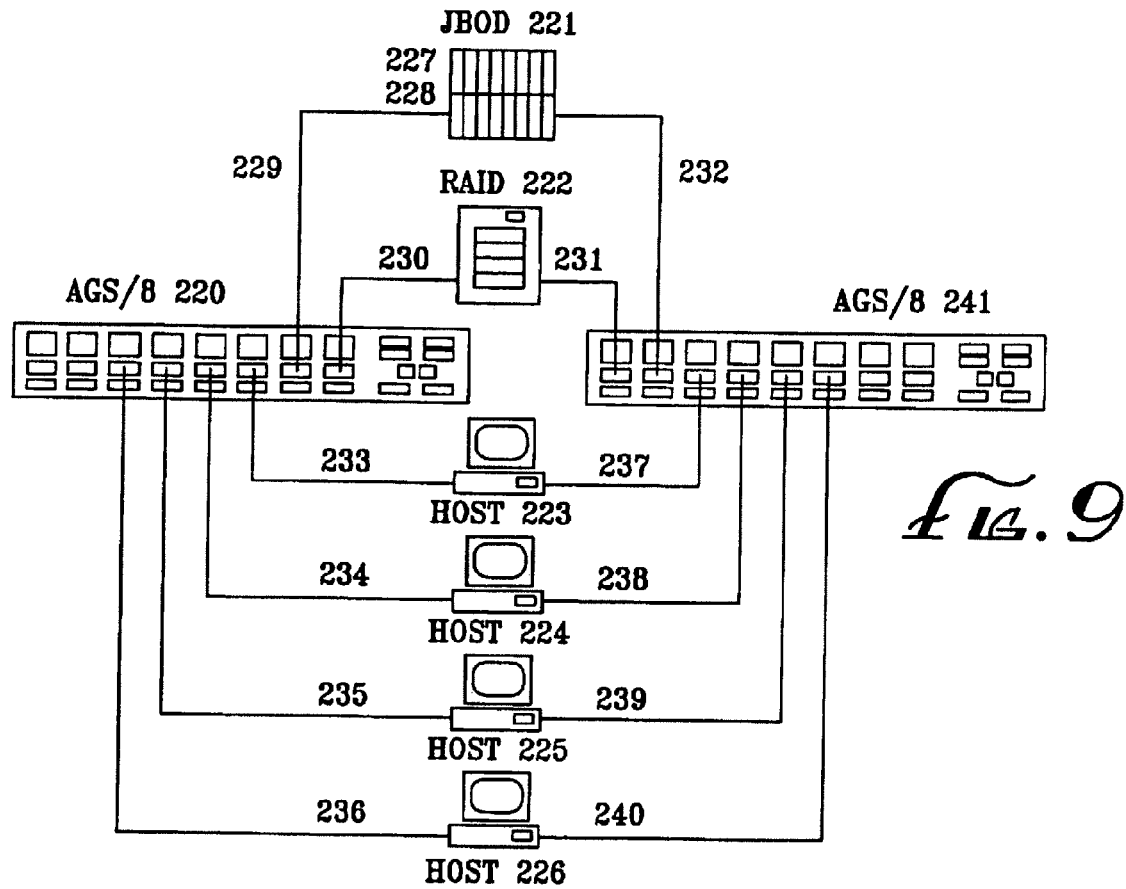
FIG. 9 is a block diagram showing the interconnection of a JBOD and a RAID storage subsystem with four hosts. Each device is connected through a redundant path.

FIG. 9 shows a topology utilizing two redundant fabrics 220, 241 to provide redundant links 229, 230, 231, 232, 233, 234, 235, 236, 237, 238, 239, 240 from hosts 223, 224, 225, 226 to either JBOD 221 or RAID 222 devices. Both the routing tables and the port ALPA filtering tables for the two fabrics would be identical.

Figure 10:
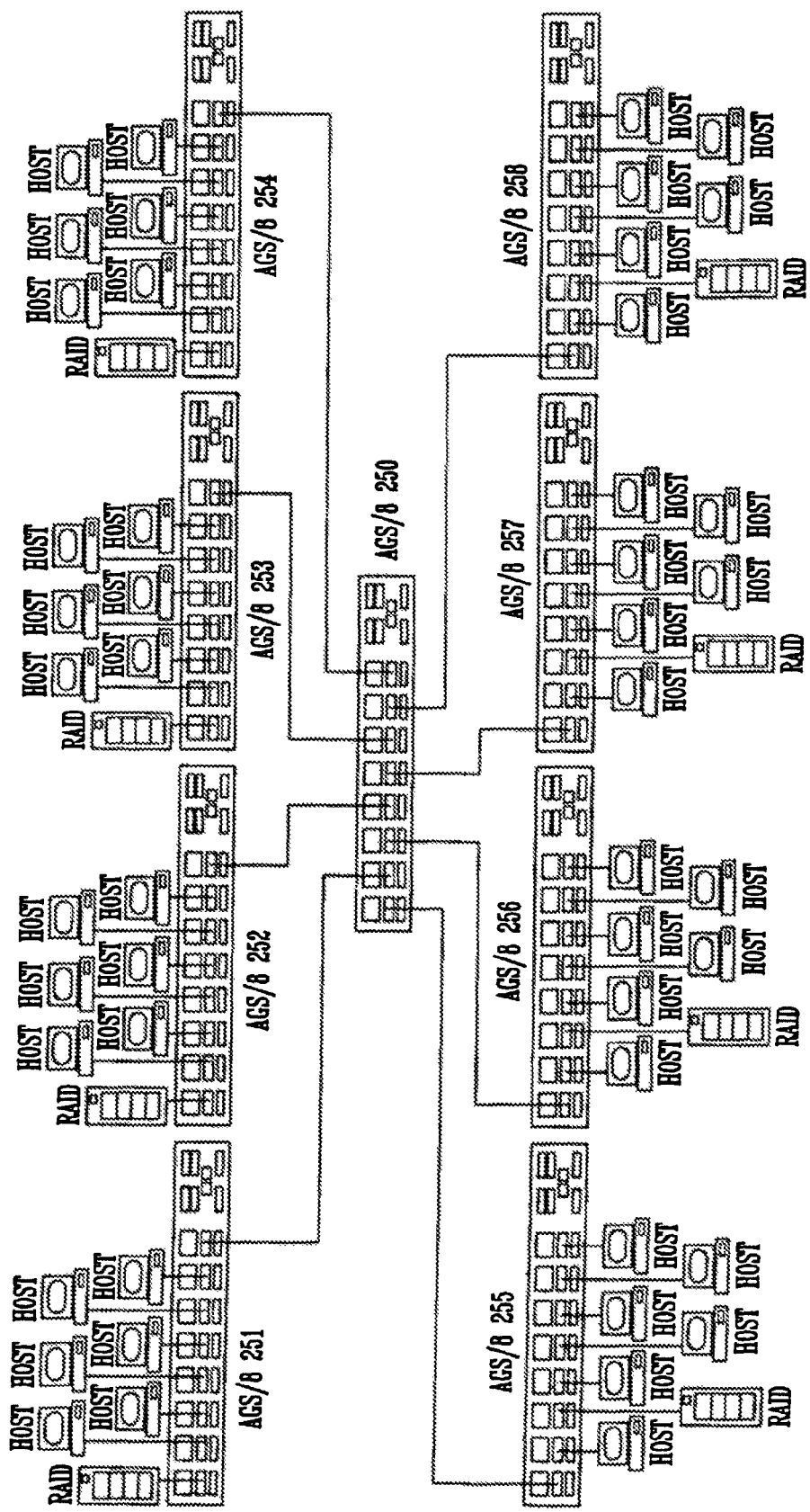
FIG. 10 is a block diagram showing the interconnection of forty eight hosts with eight RAID storage subsystems.

FIG. 10 shows a topology containing maximum single ALPA private loop devices interconnected with fabrics 250, 251, 252, 253, 254, 255, 256, 257, 258. There are no devices with multiple ALPA's in this topology such as JBODs or hubs.

Figure 11:
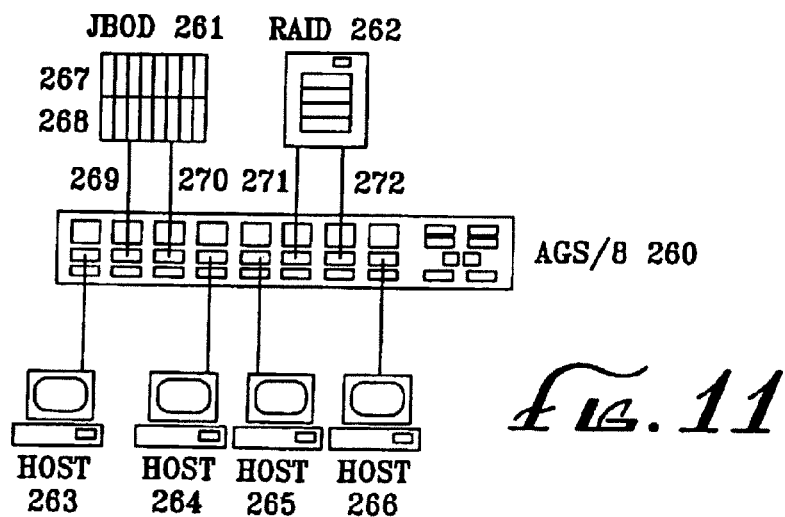
FIG. 11 is a block diagram showing the interconnection of four hosts with a JBOD and a RAID storage subsystem. There are redundant links to the JBOD and the RAID subsystems.

FIG. 11 shows a topology of two storage systems, a JBOD 261 and a RAID 262, which are connected to a fabric with redundant links 269, 270 and 271, 272. FIG. 11 also shows interconnection of four host private loop devices 263, 264, 265, 266. Each storage system connection is composed of a primary/active link 269, 271 and a backup link 270, 272.

Figure 12:
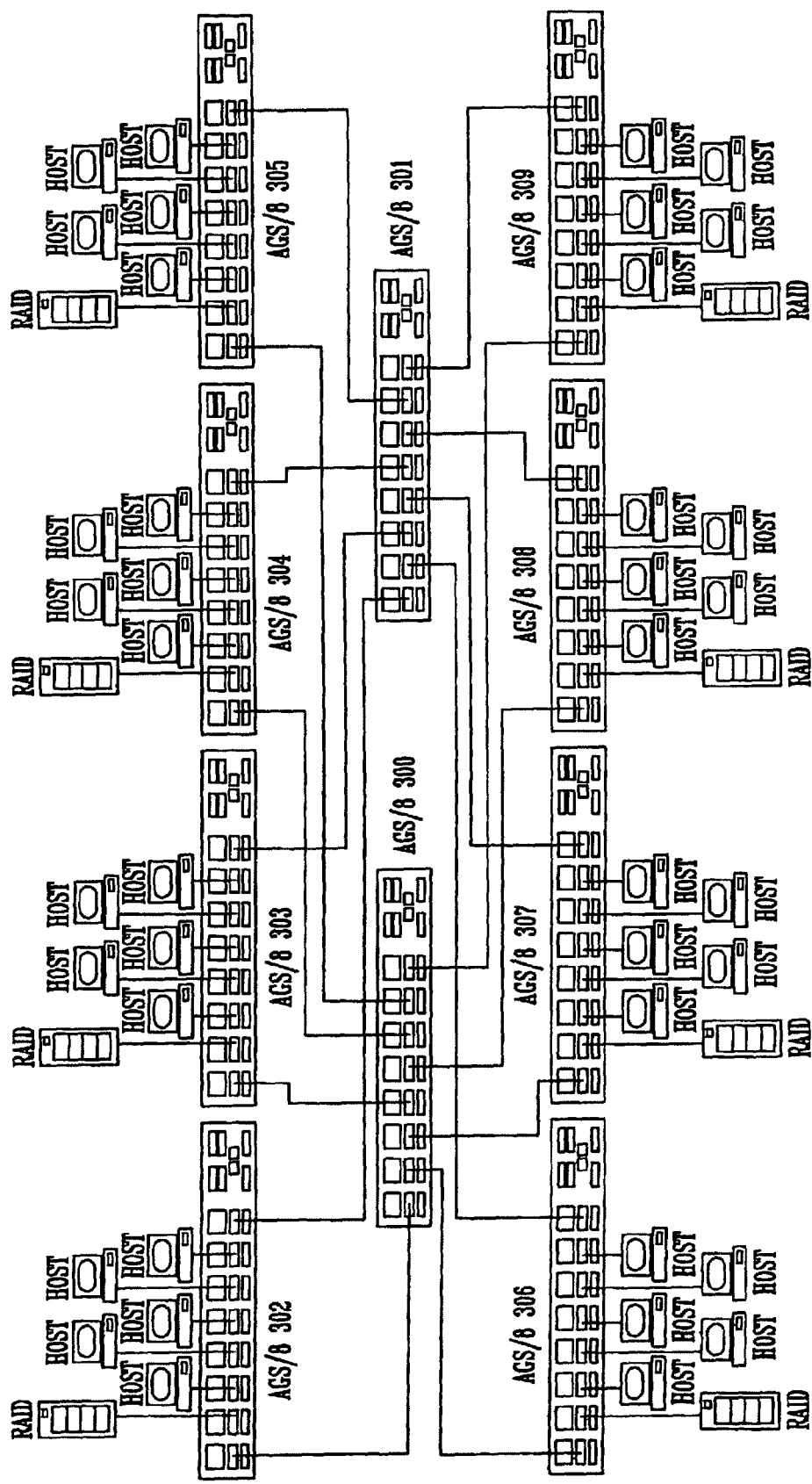
FIG. 12 is a block diagram showing the interconnection of forty hosts with eight RAID storage subsystems. There are redundant paths for all connections which span at least two fabrics.

FIG. 12 shows a topology similar to FIG. 10 except for redundant fabrics 300, 301 interconnecting the leaf or outer fabrics 302, 303, 304, 305, 306, 307, 308, 309. This topology allows redundant paths between each leaf fabric.

K. OTHER DOCUMENTS

The following documents provide selected ANSI information regarding Fibre Channel technology:

1) ANSI X3.230-1994, "Fibre Channel Physical and Signaling Interface (FC-PH)".
2) ANSI X3.297-1996, "Fibre Channel Physical and Signaling Interface (FC-PH-2)".
3) ANSI X3.303-1996, "Fibre Channel Physical and Signaling Interface (FC-PH-3)".
4) ANSI X3.272-1996, "Fibre Channel Arbitrated Loop (FC-AL)".
5) ANSI X3T11 Project #1162-DT, "Fibre Channel Private Loop Direct Attach (PLDA)".
6) ANSI X3T11 Project #1133-D, "Fibre Channel Arbitrated Loop 2 (FC-AL-2)".
7) Kembel, R., "The Fibre Channel Consultant—Arbitrated Loop", Connectivity Solutions. ISBN 0-931836-82-4, 1996, 1997.

Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

I claim:

1. An interconnect system for interconnecting a Fibre Channel and an Ethernet link, the interconnect system comprising:
   a port comprising an optical receiver;
   a port control module coupled to the port and operable to perform 8B/10B encoding and decoding;
   a route determination module for selecting a route between the port control module and the Ethernet link; and
   a connectivity module coupled to the port control module and to the route determination module for switching frames between the port control module and the Ethernet link under control of the route determination module, whereby Fibre Channel frames are transferred to the Ethernet link.

2. The interconnect system of claim 1, wherein the port comprises an optical transmitter.

3. The interconnect system of claim 1, wherein the port supports duplex communication.

4. The interconnect system of claim 1, wherein the port comprises a gigabit interface.

5. The interconnect system of claim 1, wherein the port control module operates according to a transmission protocol.

6. The interconnect system of claim 1, wherein the connectivity module operates according to a signaling protocol.

7. The interconnect system of claim 1, wherein the connectivity module is operably connected to a FIFO to receive data from the port.

8. The interconnect system of claim 7, wherein the port control module guards against a receive FIFO overrun condition.

9. The interconnect system of claim 1, wherein the port control module receives data from the connectivity module that is to be transmitted from the port.

10. A network controller for interconnecting a Fibre Channel network and an Ethernet network, the network controller comprising:
    a first port operable to transmit data and receive data over the Fibre Channel network;
    a second port operable to transmit data and receive data over the Ethernet network;
    a transmission layer module operably connected to the first port and the second port, the transmission layer module operable to encode data and decode data;
    a signaling layer module operably connected to the transmission layer module, the signaling layer module operable to control data movement between the Fibre Channel network and the Ethernet network, a route for the data movement being determined according to a header within the received data; and
    a FIFO operably connected to the signaling layer module, the FIFO operable to buffer received data.

11. The network controller of claim 10, wherein the first port comprises an optical transceiver.

12. The network controller of claim 10, wherein the first port and the second port support duplex communication.

13. The network controller of claim 10, wherein the transmission layer module comprises a port control module.

14. The network controller of claim 10, wherein the signaling layer module comprises a connectivity module.

15. The network controller of claim 10, wherein the transmission layer module guards against a receive FIFO overrun condition.

16. The network controller of claim 10, wherein the transmission layer module receives data from the signaling layer module that is to be transmitted from one of the first port and the second port.

* * * * *